(12) United States Patent
Ramanan et al.

(10) Patent No.: US 10,171,611 B2
(45) Date of Patent: Jan. 1, 2019

(54) HERD BASED SCAN AVOIDANCE SYSTEM IN A NETWORK ENVIRONMENT

(71) Applicant: McAfee, LLC, Santa Clara, CA (US)

(72) Inventors: Venkata Ramanan, Tamilnadu (IN); Simon Hunt, Naples, FL (US)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 14/635,096

(22) Filed: Mar. 2, 2015

(65) Prior Publication Data

US 2015/0180997 A1    Jun. 25, 2015

Related U.S. Application Data

(63) Continuation of application No. 13/728,705, filed on Dec. 27, 2012, now Pat. No. 8,973,146.

(51) Int. Cl.
*H04L 29/06* (2006.01)
*H04L 29/08* (2006.01)
*G06F 21/56* (2013.01)

(52) U.S. Cl.
CPC .......... *H04L 67/2842* (2013.01); *G06F 21/56* (2013.01); *G06F 21/567* (2013.01);
(Continued)

(58) Field of Classification Search
CPC ................. G06F 21/56; G06F 21/567; G06F 2221/2115; H04L 67/2842; H04L 67/1095; H04L 63/145
See application file for complete search history.

(56) References Cited

U.S. PATENT DOCUMENTS

| 4,688,169 A | 8/1987 | Joshi |
| 4,982,430 A | 1/1991 | Frezza et al. |

(Continued)

FOREIGN PATENT DOCUMENTS

| CN | 1383295 A | 12/2002 |
| CN | 101147379 | 3/2008 |

(Continued)

OTHER PUBLICATIONS

"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).

(Continued)

*Primary Examiner* — Mahfuzur Rahman
(74) *Attorney, Agent, or Firm* — Patent Capital Group

(57) ABSTRACT

A method in one example embodiment includes generating a signature for an object in a compute node in a network, searching a memory element for the signature, and responsive to determining the memory element does not contain the signature, scanning the object. The method also includes updating the memory element with a scan result, and synchronizing the memory element of the compute node with one or more memory elements of one or more other compute nodes in the network. In specific embodiments, the scan result includes the signature of the object and a threat level of the object. In further embodiments, the synchronizing includes sending the scan result to one or more other compute nodes in the network. In more specific embodiments, the scan result is sent with one or more other scan results after a predetermined interval of time from a previous synchronization.

20 Claims, 8 Drawing Sheets

(52) U.S. Cl.
CPC ........ *H04L 63/145* (2013.01); *H04L 67/1095* (2013.01); *G06F 2221/2115* (2013.01)

(56) References Cited

U.S. PATENT DOCUMENTS

| | | |
|---|---|---|
| 5,155,847 A | 10/1992 | Kirouac et al. |
| 5,222,134 A | 6/1993 | Waite et al. |
| 5,390,314 A | 2/1995 | Swanson |
| 5,521,849 A | 5/1996 | Adelson et al. |
| 5,560,008 A | 9/1996 | Johnson et al. |
| 5,699,513 A | 12/1997 | Feigen et al. |
| 5,778,226 A | 7/1998 | Adams et al. |
| 5,778,349 A | 7/1998 | Okonogi |
| 5,787,427 A | 7/1998 | Benantar et al. |
| 5,842,017 A | 11/1998 | Hookway et al. |
| 5,873,086 A | 2/1999 | Fujii et al. |
| 5,884,298 A | 3/1999 | Smith, II et al. |
| 5,907,709 A | 5/1999 | Cantey et al. |
| 5,907,860 A | 5/1999 | Garibay et al. |
| 5,926,832 A | 7/1999 | Wing et al. |
| 5,944,839 A | 8/1999 | Isenberg |
| 5,974,149 A | 10/1999 | Leppek |
| 5,987,557 A | 11/1999 | Ebrahim |
| 5,987,610 A | 11/1999 | Franczek et al. |
| 5,987,611 A | 11/1999 | Freund |
| 5,991,881 A | 11/1999 | Conklin et al. |
| 6,064,815 A | 5/2000 | Hohensee et al. |
| 6,073,142 A | 6/2000 | Geiger et al. |
| 6,141,698 A | 10/2000 | Krishnan et al. |
| 6,182,142 B1 | 1/2001 | Win et al. |
| 6,192,401 B1 | 2/2001 | Modiri et al. |
| 6,192,475 B1 | 2/2001 | Wallace |
| 6,256,773 B1 | 7/2001 | Bowman-Amuah |
| 6,275,938 B1 | 8/2001 | Bond et al. |
| 6,321,267 B1 | 11/2001 | Donaldson |
| 6,338,149 B1 | 1/2002 | Ciccone, Jr. et al. |
| 6,356,957 B2 | 3/2002 | Sanchez, II et al. |
| 6,377,808 B1 | 4/2002 | Korneluk et al. |
| 6,393,465 B2 | 5/2002 | Leeds |
| 6,442,686 B1 | 8/2002 | McArdle et al. |
| 6,449,040 B1 | 9/2002 | Fujita |
| 6,453,468 B1 | 9/2002 | D'Souza |
| 6,460,050 B1 | 10/2002 | Pace et al. |
| 6,496,477 B1 | 12/2002 | Perkins et al. |
| 6,587,877 B1 | 7/2003 | Douglis et al. |
| 6,611,925 B1 | 8/2003 | Spear |
| 6,658,645 B1 | 12/2003 | Akuta et al. |
| 6,662,219 B1 | 12/2003 | Nishanov et al. |
| 6,748,534 B1 | 6/2004 | Gryaznov et al. |
| 6,769,008 B1 | 7/2004 | Kumar et al. |
| 6,769,115 B1 | 7/2004 | Oldman |
| 6,772,345 B1 | 8/2004 | Shetty |
| 6,795,966 B1 | 9/2004 | Lim et al. |
| 6,832,227 B2 | 12/2004 | Seki et al. |
| 6,834,301 B1 | 12/2004 | Hanchett |
| 6,847,993 B1 | 1/2005 | Novaes et al. |
| 6,907,600 B2 | 6/2005 | Neiger et al. |
| 6,918,110 B2 | 7/2005 | Hundt et al. |
| 6,930,985 B1 | 8/2005 | Rathi et al. |
| 6,934,755 B1 | 8/2005 | Saulpaugh et al. |
| 6,941,470 B1 | 9/2005 | Jooste |
| 6,988,101 B2 | 1/2006 | Ham et al. |
| 6,988,124 B2 | 1/2006 | Douceur et al. |
| 7,007,302 B1 | 2/2006 | Jagger et al. |
| 7,010,796 B1 | 3/2006 | Strom et al. |
| 7,024,548 B1 | 4/2006 | O'Toole, Jr. |
| 7,039,949 B2 | 5/2006 | Cartmell et al. |
| 7,054,930 B1 | 5/2006 | Cheriton |
| 7,065,767 B2 | 6/2006 | Kambhammettu et al. |
| 7,069,330 B1 | 6/2006 | McArdle et al. |
| 7,082,456 B2 | 7/2006 | Mani-Meitav et al. |
| 7,093,239 B1 | 8/2006 | van der Made |
| 7,096,500 B2 | 8/2006 | Roberts et al. |
| 7,124,409 B2 | 10/2006 | Davis et al. |
| 7,139,916 B2 | 11/2006 | Billingsley et al. |
| 7,152,148 B2 | 12/2006 | Williams et al. |
| 7,159,036 B2 | 1/2007 | Hinchliffe et al. |
| 7,177,267 B2 | 2/2007 | Oliver et al. |
| 7,203,864 B2 | 4/2007 | Goin et al. |
| 7,251,655 B2 | 7/2007 | Kaler et al. |
| 7,290,266 B2 | 10/2007 | Gladstone et al. |
| 7,302,558 B2 | 11/2007 | Campbell et al. |
| 7,330,849 B2 | 2/2008 | Gerasoulis et al. |
| 7,340,684 B2 | 3/2008 | Ramamoorthy et al. |
| 7,346,781 B2 | 3/2008 | Cowle et al. |
| 7,349,931 B2 | 3/2008 | Horne |
| 7,350,204 B2 | 3/2008 | Lambert et al. |
| 7,353,501 B2 | 4/2008 | Tang et al. |
| 7,360,097 B2 | 4/2008 | Rothstein |
| 7,363,022 B2 | 4/2008 | Whelan et al. |
| 7,370,360 B2 | 5/2008 | van der Made |
| 7,385,938 B1 | 6/2008 | Beckett et al. |
| 7,406,517 B2 | 7/2008 | Hunt et al. |
| 7,406,603 B1 | 7/2008 | MacKay |
| 7,441,265 B2 | 10/2008 | Staamann et al. |
| 7,463,590 B2 | 12/2008 | Mualem et al. |
| 7,464,408 B1 | 12/2008 | Shah et al. |
| 7,506,155 B1 | 3/2009 | Stewart et al. |
| 7,506,170 B2 | 3/2009 | Finnegan |
| 7,506,364 B2 | 3/2009 | Vayman |
| 7,546,333 B2 | 6/2009 | Alon et al. |
| 7,546,594 B2 | 6/2009 | McGuire et al. |
| 7,552,479 B1 | 6/2009 | Conover et al. |
| 7,577,995 B2 | 8/2009 | Chebolu et al. |
| 7,603,552 B1 | 10/2009 | Sebes et al. |
| 7,607,170 B2 | 10/2009 | Chesla |
| 7,657,599 B2 | 2/2010 | Smith |
| 7,669,195 B1 | 2/2010 | Qumei |
| 7,685,632 B2 | 3/2010 | Vayman |
| 7,685,635 B2 | 3/2010 | Vega et al. |
| 7,694,150 B1 * | 4/2010 | Kirby ................ G06F 21/55 713/188 |
| 7,698,744 B2 | 4/2010 | Fanton et al. |
| 7,703,090 B2 | 4/2010 | Napier et al. |
| 7,739,497 B1 | 6/2010 | Fink et al. |
| 7,757,269 B1 | 7/2010 | Roy-Chowdhury et al. |
| 7,765,538 B2 | 7/2010 | Zweifel et al. |
| 7,783,735 B1 | 8/2010 | Sebes et al. |
| 7,809,704 B2 | 10/2010 | Surendran et al. |
| 7,814,554 B1 | 10/2010 | Ragner |
| 7,818,377 B2 | 10/2010 | Whitney et al. |
| 7,823,148 B2 | 10/2010 | Deshpande et al. |
| 7,836,504 B2 | 11/2010 | Ray et al. |
| 7,840,968 B1 | 11/2010 | Sharma et al. |
| 7,849,507 B1 | 12/2010 | Bloch et al. |
| 7,853,643 B1 | 12/2010 | Martinez et al. |
| 7,856,661 B1 | 12/2010 | Sebes et al. |
| 7,865,931 B1 | 1/2011 | Stone et al. |
| 7,870,387 B1 | 1/2011 | Bhargava et al. |
| 7,873,955 B1 | 1/2011 | Sebes et al. |
| 7,895,573 B1 | 2/2011 | Bhargava et al. |
| 7,908,653 B2 | 3/2011 | Brickell et al. |
| 7,925,722 B1 | 4/2011 | Reed et al. |
| 7,937,455 B2 | 5/2011 | Saha et al. |
| 7,950,056 B1 | 5/2011 | Satish et al. |
| 7,966,659 B1 | 6/2011 | Wilkinson et al. |
| 7,996,836 B1 | 8/2011 | McCorkendale et al. |
| 8,015,388 B1 | 9/2011 | Rihan et al. |
| 8,015,563 B2 | 9/2011 | Araujo et al. |
| 8,028,340 B2 | 9/2011 | Sebes et al. |
| 8,055,904 B1 | 11/2011 | Cato et al. |
| 8,099,060 B2 | 1/2012 | Kirkup et al. |
| 8,136,143 B2 | 3/2012 | Hannel et al. |
| 8,166,474 B1 | 4/2012 | Delco et al. |
| 8,195,931 B1 | 6/2012 | Sharma et al. |
| 8,205,188 B2 | 6/2012 | Ramamoorthy et al. |
| 8,209,680 B1 | 6/2012 | Le et al. |
| 8,234,709 B2 | 7/2012 | Viljoen et al. |
| 8,234,713 B2 | 7/2012 | Roy-Chowdhury et al. |
| 8,307,437 B2 | 11/2012 | Sebes et al. |
| 8,321,932 B2 | 11/2012 | Bhargava et al. |
| 8,332,929 B1 | 12/2012 | Bhargava et al. |
| 8,352,930 B1 | 1/2013 | Sebes et al. |
| 8,381,284 B2 | 2/2013 | Dang et al. |

(56) References Cited

U.S. PATENT DOCUMENTS

| | | |
|---|---|---|
| 8,387,046 B1 | 2/2013 | Montague et al. |
| 8,515,075 B1 | 8/2013 | Saraf et al. |
| 8,539,063 B1 | 9/2013 | Sharma et al. |
| 8,544,003 B1 | 9/2013 | Sawhney et al. |
| 8,549,003 B1 | 10/2013 | Bhargava et al. |
| 8,549,546 B2 | 10/2013 | Sharma et al. |
| 8,555,404 B1 | 10/2013 | Sebes et al. |
| 8,561,051 B2 | 10/2013 | Sebes et al. |
| 8,561,082 B2 | 10/2013 | Sharma et al. |
| 8,584,199 B1 | 11/2013 | Chen et al. |
| 8,701,182 B2 | 4/2014 | Bhargava et al. |
| 8,707,422 B2 | 4/2014 | Bhargava et al. |
| 8,707,446 B2 | 4/2014 | Roy-Chowdhury et al. |
| 8,713,668 B2 | 4/2014 | Cooper et al. |
| 8,726,391 B1* | 5/2014 | Zhong .............. G06F 21/56 726/25 |
| 8,739,272 B1 | 5/2014 | Cooper et al. |
| 8,762,928 B2 | 6/2014 | Sharma et al. |
| 8,763,118 B2 | 6/2014 | Sebes et al. |
| 8,793,489 B2 | 7/2014 | Polunin et al. |
| 8,800,024 B2 | 8/2014 | Cooper et al. |
| 8,843,903 B1 | 9/2014 | Blaser et al. |
| 8,869,265 B2 | 10/2014 | Dang et al. |
| 8,875,292 B1* | 10/2014 | Bogorad .............. G06F 21/564 726/24 |
| 8,904,520 B1 | 12/2014 | Nachenberg et al. |
| 8,925,101 B2 | 12/2014 | Bhargava et al. |
| 8,938,800 B2 | 1/2015 | Bhargava et al. |
| 8,973,146 B2 | 3/2015 | Ramanan et al. |
| 9,112,830 B2 | 8/2015 | Cooper et al. |
| 9,134,998 B2 | 9/2015 | Roy-Chowdhury et al. |
| 9,413,785 B2 | 8/2016 | Cooper et al. |
| 9,424,154 B2 | 8/2016 | Bhargava et al. |
| 9,467,470 B2 | 10/2016 | Bhargava et al. |
| 9,576,142 B2 | 2/2017 | Bhargava et al. |
| 9,578,052 B2 | 2/2017 | CP et al. |
| 9,594,881 B2 | 3/2017 | Bhargava et al. |
| 9,602,515 B2 | 3/2017 | Roy-Chowdhury et al. |
| 2002/0056076 A1 | 5/2002 | van der Made |
| 2002/0069367 A1 | 6/2002 | Tindal et al. |
| 2002/0083175 A1 | 6/2002 | Afek et al. |
| 2002/0099671 A1 | 7/2002 | Mastin Crosbie et al. |
| 2002/0114319 A1 | 8/2002 | Liu et al. |
| 2002/0118644 A1 | 8/2002 | Moir |
| 2002/0133586 A1 | 9/2002 | Shanklin et al. |
| 2003/0014667 A1 | 1/2003 | Kolichtchak |
| 2003/0023736 A1 | 1/2003 | Abkemeier |
| 2003/0033510 A1 | 2/2003 | Dice |
| 2003/0061506 A1 | 3/2003 | Cooper et al. |
| 2003/0065945 A1 | 4/2003 | Lingafelt et al. |
| 2003/0073894 A1 | 4/2003 | Chiang et al. |
| 2003/0074552 A1 | 4/2003 | Olkin et al. |
| 2003/0088680 A1 | 5/2003 | Nachenberg et al. |
| 2003/0115222 A1 | 6/2003 | Oashi et al. |
| 2003/0120601 A1 | 6/2003 | Ouye et al. |
| 2003/0120811 A1 | 6/2003 | Hanson et al. |
| 2003/0120935 A1 | 6/2003 | Teal et al. |
| 2003/0140210 A1 | 7/2003 | Testardi |
| 2003/0145232 A1 | 7/2003 | Poletto et al. |
| 2003/0163718 A1 | 8/2003 | Johnson et al. |
| 2003/0167292 A1 | 9/2003 | Ross |
| 2003/0167399 A1 | 9/2003 | Audebert et al. |
| 2003/0200332 A1 | 10/2003 | Gupta et al. |
| 2003/0212902 A1 | 11/2003 | van der Made |
| 2003/0220944 A1 | 11/2003 | Schottland et al. |
| 2003/0221190 A1 | 11/2003 | Deshpande et al. |
| 2004/0003258 A1 | 1/2004 | Billingsley et al. |
| 2004/0015554 A1 | 1/2004 | Wilson |
| 2004/0051736 A1 | 3/2004 | Daniell |
| 2004/0054928 A1 | 3/2004 | Hall |
| 2004/0057454 A1 | 3/2004 | Hennegan et al. |
| 2004/0088398 A1 | 5/2004 | Barlow |
| 2004/0139206 A1 | 7/2004 | Claudatos et al. |
| 2004/0143749 A1 | 7/2004 | Tajali et al. |
| 2004/0153650 A1 | 8/2004 | Hillmer |
| 2004/0167906 A1 | 8/2004 | Smith et al. |
| 2004/0172551 A1 | 9/2004 | Fielding et al. |
| 2004/0230963 A1 | 11/2004 | Rothman et al. |
| 2004/0243678 A1 | 12/2004 | Smith et al. |
| 2004/0255161 A1 | 12/2004 | Cavanaugh |
| 2004/0268149 A1 | 12/2004 | Aaron |
| 2005/0005006 A1 | 1/2005 | Chauffour et al. |
| 2005/0018651 A1 | 1/2005 | Yan et al. |
| 2005/0022014 A1 | 1/2005 | Shipman |
| 2005/0050336 A1 | 3/2005 | Liang et al. |
| 2005/0071633 A1 | 3/2005 | Rothstein |
| 2005/0081053 A1* | 4/2005 | Aston .............. G06F 21/564 726/24 |
| 2005/0086047 A1 | 4/2005 | Uchimoto et al. |
| 2005/0091321 A1 | 4/2005 | Daniell et al. |
| 2005/0091487 A1 | 4/2005 | Cross et al. |
| 2005/0108516 A1 | 5/2005 | Balzer et al. |
| 2005/0108562 A1 | 5/2005 | Khazan et al. |
| 2005/0114672 A1 | 5/2005 | Duncan et al. |
| 2005/0132346 A1 | 6/2005 | Tsantilis |
| 2005/0198519 A1 | 9/2005 | Tamura et al. |
| 2005/0228990 A1 | 10/2005 | Kato et al. |
| 2005/0235360 A1 | 10/2005 | Pearson |
| 2005/0256907 A1 | 11/2005 | Novik et al. |
| 2005/0257207 A1 | 11/2005 | Blumfield et al. |
| 2005/0257265 A1 | 11/2005 | Cook et al. |
| 2005/0260996 A1 | 11/2005 | Groenendaal |
| 2005/0262558 A1 | 11/2005 | Usov |
| 2005/0273858 A1 | 12/2005 | Zadok et al. |
| 2005/0278784 A1 | 12/2005 | Gupta et al. |
| 2005/0283823 A1 | 12/2005 | Okajo et al. |
| 2005/0289538 A1 | 12/2005 | Black-Ziegelbein et al. |
| 2006/0004875 A1 | 1/2006 | Baron et al. |
| 2006/0015501 A1 | 1/2006 | Sanamrad et al. |
| 2006/0037016 A1 | 2/2006 | Saha et al. |
| 2006/0072451 A1 | 4/2006 | Ross |
| 2006/0075299 A1 | 4/2006 | Chandramouleeswaran et al. |
| 2006/0075478 A1 | 4/2006 | Hyndman et al. |
| 2006/0080656 A1 | 4/2006 | Cain et al. |
| 2006/0085785 A1 | 4/2006 | Garrett |
| 2006/0101277 A1 | 5/2006 | Meenan et al. |
| 2006/0133223 A1 | 6/2006 | Nakamura et al. |
| 2006/0136910 A1 | 6/2006 | Brickell et al. |
| 2006/0136911 A1 | 6/2006 | Robinson et al. |
| 2006/0143713 A1 | 6/2006 | Challener et al. |
| 2006/0168213 A1 | 7/2006 | Richardson et al. |
| 2006/0195906 A1 | 8/2006 | Jin et al. |
| 2006/0200863 A1 | 9/2006 | Ray et al. |
| 2006/0230314 A1 | 10/2006 | Sanjar et al. |
| 2006/0236398 A1 | 10/2006 | Trakic et al. |
| 2006/0259734 A1 | 11/2006 | Sheu et al. |
| 2006/0277603 A1 | 12/2006 | Kelso et al. |
| 2007/0011746 A1 | 1/2007 | Malpani et al. |
| 2007/0028303 A1 | 2/2007 | Brennan |
| 2007/0033645 A1 | 2/2007 | Jones |
| 2007/0039049 A1 | 2/2007 | Kupferman et al. |
| 2007/0050579 A1 | 3/2007 | Hall et al. |
| 2007/0050764 A1 | 3/2007 | Traut |
| 2007/0074199 A1 | 3/2007 | Schoenberg |
| 2007/0083522 A1 | 4/2007 | Nord et al. |
| 2007/0101435 A1 | 5/2007 | Konanka et al. |
| 2007/0136579 A1 | 6/2007 | Levy et al. |
| 2007/0143851 A1 | 6/2007 | Nicodemus et al. |
| 2007/0157303 A1 | 7/2007 | Pankratov |
| 2007/0168861 A1 | 7/2007 | Bell et al. |
| 2007/0169079 A1 | 7/2007 | Keller et al. |
| 2007/0192329 A1 | 8/2007 | Croft et al. |
| 2007/0214504 A1 | 9/2007 | Milani Comparetti et al. |
| 2007/0220061 A1 | 9/2007 | Tirosh et al. |
| 2007/0220507 A1 | 9/2007 | Back et al. |
| 2007/0232265 A1* | 10/2007 | Park .............. H04L 63/104 455/410 |
| 2007/0253430 A1 | 11/2007 | Minami et al. |
| 2007/0256138 A1 | 11/2007 | Gadea et al. |
| 2007/0271561 A1 | 11/2007 | Winner et al. |
| 2007/0276950 A1 | 11/2007 | Dadhia |
| 2007/0297333 A1 | 12/2007 | Zuk et al. |
| 2007/0297396 A1 | 12/2007 | Eldar et al. |
| 2007/0300215 A1 | 12/2007 | Bardsley |

(56) References Cited

U.S. PATENT DOCUMENTS

| | | |
|---|---|---|
| 2008/0005737 A1 | 1/2008 | Saha et al. |
| 2008/0005798 A1 | 1/2008 | Ross |
| 2008/0010304 A1 | 1/2008 | Vempala et al. |
| 2008/0022384 A1 | 1/2008 | Yee et al. |
| 2008/0034416 A1 | 2/2008 | Kumar et al. |
| 2008/0034418 A1 | 2/2008 | Venkatraman et al. |
| 2008/0052468 A1 | 2/2008 | Speirs et al. |
| 2008/0059123 A1 | 3/2008 | Estberg et al. |
| 2008/0082662 A1 | 4/2008 | Dandliker et al. |
| 2008/0082977 A1 | 4/2008 | Araujo et al. |
| 2008/0086513 A1 | 4/2008 | O'Brien |
| 2008/0115012 A1 | 5/2008 | Jann et al. |
| 2008/0120499 A1 | 5/2008 | Zimmer et al. |
| 2008/0141371 A1 | 6/2008 | Bradicich et al. |
| 2008/0155336 A1 | 6/2008 | Joshi et al. |
| 2008/0163207 A1 | 7/2008 | Reumann et al. |
| 2008/0163210 A1 | 7/2008 | Bowman et al. |
| 2008/0165952 A1 | 7/2008 | Smith et al. |
| 2008/0184373 A1 | 7/2008 | Traut et al. |
| 2008/0235534 A1 | 9/2008 | Schunter et al. |
| 2008/0282080 A1 | 11/2008 | Hyndman et al. |
| 2008/0294703 A1 | 11/2008 | Craft et al. |
| 2008/0295173 A1 | 11/2008 | Tsvetanov |
| 2008/0301770 A1 | 12/2008 | Kinder |
| 2008/0307524 A1 | 12/2008 | Singh et al. |
| 2009/0007100 A1 | 1/2009 | Field et al. |
| 2009/0038017 A1 | 2/2009 | Durham et al. |
| 2009/0043993 A1 | 2/2009 | Ford et al. |
| 2009/0049172 A1* | 2/2009 | Miller ................. H04L 41/12 709/225 |
| 2009/0055693 A1 | 2/2009 | Budko et al. |
| 2009/0063665 A1 | 3/2009 | Bagepalli et al. |
| 2009/0113110 A1 | 4/2009 | Chen et al. |
| 2009/0144300 A1 | 6/2009 | Chatley et al. |
| 2009/0150639 A1 | 6/2009 | Ohata |
| 2009/0158430 A1 | 6/2009 | Borders |
| 2009/0178110 A1 | 7/2009 | Higuchi |
| 2009/0220080 A1 | 9/2009 | Herne et al. |
| 2009/0249053 A1 | 10/2009 | Zimmer et al. |
| 2009/0249438 A1 | 10/2009 | Litvin et al. |
| 2009/0320010 A1 | 12/2009 | Chow et al. |
| 2009/0320133 A1 | 12/2009 | Viljoen et al. |
| 2009/0320140 A1 | 12/2009 | Sebes et al. |
| 2009/0328144 A1 | 12/2009 | Sherlock et al. |
| 2009/0328185 A1 | 12/2009 | van der Berg et al. |
| 2010/0049973 A1 | 2/2010 | Chen |
| 2010/0071035 A1 | 3/2010 | Budko et al. |
| 2010/0100970 A1 | 4/2010 | Roy-Chowdhury et al. |
| 2010/0114825 A1 | 5/2010 | Siddegowda |
| 2010/0138430 A1 | 6/2010 | Gotou |
| 2010/0188976 A1 | 7/2010 | Rahman et al. |
| 2010/0250895 A1 | 9/2010 | Adams et al. |
| 2010/0281133 A1 | 11/2010 | Brendel |
| 2010/0293225 A1 | 11/2010 | Sebes et al. |
| 2010/0299277 A1 | 11/2010 | Emelo et al. |
| 2010/0332910 A1 | 12/2010 | Ali et al. |
| 2011/0029772 A1 | 2/2011 | Fanton et al. |
| 2011/0035423 A1 | 2/2011 | Kobayashi et al. |
| 2011/0047542 A1 | 2/2011 | Dang et al. |
| 2011/0047543 A1 | 2/2011 | Mohinder |
| 2011/0060845 A1 | 3/2011 | Jungck |
| 2011/0061092 A1 | 3/2011 | Bailloeul et al. |
| 2011/0077948 A1 | 3/2011 | Sharma et al. |
| 2011/0078550 A1 | 3/2011 | Nabutovsky |
| 2011/0093842 A1 | 4/2011 | Sebes |
| 2011/0093950 A1 | 4/2011 | Bhargava et al. |
| 2011/0113467 A1 | 5/2011 | Agarwal et al. |
| 2011/0119760 A1 | 5/2011 | Sebes et al. |
| 2011/0138461 A1 | 6/2011 | Bhargava et al. |
| 2011/0225128 A1* | 9/2011 | Jarrett ................. G06F 8/61 707/692 |
| 2011/0246753 A1 | 10/2011 | Thomas |
| 2011/0302647 A1 | 12/2011 | Bhattacharya et al. |
| 2012/0030731 A1 | 2/2012 | Bhargava et al. |
| 2012/0030750 A1 | 2/2012 | Bhargava et al. |
| 2012/0110666 A1 | 5/2012 | Ogilvie |
| 2012/0159631 A1 | 6/2012 | Niemela et al. |
| 2012/0216271 A1 | 8/2012 | Cooper et al. |
| 2012/0233611 A1 | 9/2012 | Voccio |
| 2012/0272318 A1* | 10/2012 | Doukhvalov ........... G06F 21/57 726/24 |
| 2012/0278853 A1 | 11/2012 | Roy-Chowdhury et al. |
| 2012/0290827 A1 | 11/2012 | Bhargava et al. |
| 2012/0290828 A1 | 11/2012 | Bhargava et al. |
| 2012/0297176 A1 | 11/2012 | Bhargava et al. |
| 2013/0024934 A1 | 1/2013 | Sebes et al. |
| 2013/0091318 A1 | 4/2013 | Bhattacharjee et al. |
| 2013/0097355 A1 | 4/2013 | Dang et al. |
| 2013/0097356 A1 | 4/2013 | Dang et al. |
| 2013/0097658 A1 | 4/2013 | Cooper et al. |
| 2013/0097692 A1 | 4/2013 | Cooper et al. |
| 2013/0117823 A1 | 5/2013 | Dang et al. |
| 2013/0179971 A1 | 7/2013 | Harrison |
| 2013/0227683 A1 | 8/2013 | Bettini et al. |
| 2013/0246044 A1 | 9/2013 | Sharma et al. |
| 2013/0246393 A1 | 9/2013 | Saraf et al. |
| 2013/0246423 A1 | 9/2013 | Bhargava et al. |
| 2013/0246685 A1 | 9/2013 | Bhargava et al. |
| 2013/0247016 A1 | 9/2013 | Sharma et al. |
| 2013/0247027 A1 | 9/2013 | Shah et al. |
| 2013/0247032 A1 | 9/2013 | Bhargava et al. |
| 2013/0247181 A1 | 9/2013 | Saraf et al. |
| 2013/0247192 A1 | 9/2013 | Krasser et al. |
| 2013/0247201 A1 | 9/2013 | Alperovitch et al. |
| 2013/0247226 A1 | 9/2013 | Sebes et al. |
| 2013/0268994 A1 | 10/2013 | Cooper et al. |
| 2014/0090061 A1 | 3/2014 | Avasarala et al. |
| 2014/0101783 A1 | 4/2014 | Bhargava et al. |
| 2014/0189859 A1 | 7/2014 | Ramanan et al. |
| 2014/0237584 A1 | 8/2014 | Cooper et al. |
| 2014/0250492 A1 | 9/2014 | Cooper et al. |
| 2014/0283065 A1 | 9/2014 | Teddy et al. |
| 2014/0283066 A1 | 9/2014 | Teddy et al. |
| 2014/0317592 A1 | 10/2014 | Roy-Chowdhury et al. |
| 2014/0351895 A1 | 11/2014 | Bhargava et al. |
| 2015/0121449 A1 | 4/2015 | CP |
| 2015/0180884 A1 | 6/2015 | Bhargava et al. |
| 2015/0180997 A1 | 6/2015 | Ramanan et al. |
| 2015/0200968 A1 | 7/2015 | Bhargava et al. |
| 2015/0365380 A1 | 12/2015 | Cooper et al. |
| 2016/0105444 A1 | 4/2016 | Roy-Chowdhury et al. |
| 2016/0352683 A1 | 12/2016 | Cooper et al. |
| 2017/0118228 A1 | 4/2017 | CP et al. |
| 2017/0140168 A1 | 5/2017 | Bhargava et al. |
| 2017/0374030 A1 | 12/2017 | Cooper et al. |

FOREIGN PATENT DOCUMENTS

| | | |
|---|---|---|
| CN | 101218568 A | 7/2008 |
| CN | 101569129 | 10/2009 |
| CN | 101636998 A | 1/2010 |
| CN | 103283202 A | 9/2013 |
| EP | 1 482 394 A2 | 12/2004 |
| EP | 2 037 657 A1 | 3/2009 |
| EP | 2599026 | 6/2013 |
| EP | 2599276 | 6/2013 |
| JP | 2004/524598 A | 8/2004 |
| JP | 2004-078507 A | 11/2004 |
| JP | 2005-275839 | 6/2005 |
| JP | 2005-202523 | 7/2005 |
| JP | 2006-59217 | 3/2006 |
| JP | 2006-270894 A | 5/2006 |
| JP | 2006-302292 | 11/2006 |
| JP | 2007-500396 | 1/2007 |
| JP | 2008-506303 | 2/2008 |
| JP | 2008-217306 | 9/2008 |
| JP | 2008-546060 A | 12/2008 |
| JP | 2009-510858 | 3/2009 |
| JP | 2010-16834 | 1/2010 |
| WO | WO 98/44404 | 10/1998 |
| WO | WO 01/84285 A2 | 11/2001 |
| WO | WO 2006/012197 A2 | 2/2006 |
| WO | WO 2006/124832 A1 | 11/2006 |
| WO | WO 2007/016478 A2 | 2/2007 |

(56) References Cited

FOREIGN PATENT DOCUMENTS

| WO | WO 2008/054997 A2 | 5/2008 |
|---|---|---|
| WO | WO 2011/003958 A1 | 1/2011 |
| WO | WO 2011/059877 | 5/2011 |
| WO | WO 2012/015485 | 2/2012 |
| WO | WO 2012/015489 | 2/2012 |
| WO | WO 2012/116098 | 8/2012 |
| WO | WO 2013/058940 | 4/2013 |
| WO | WO 2013/058944 | 4/2013 |
| WO | WO 2014/105308 A1 | 7/2014 |
| WO | WO 2015/060857 A1 | 4/2015 |

OTHER PUBLICATIONS

Eli M. Dow, et al., "The Xen Hypervisor," INFORMIT, dated Apr. 10, 2008, http://www.informit.com/articles/printerfriendly.aspx?p=1187966, printed Aug. 11, 2009 (13 pages).
Desktop Management and Control, Website: http://www.vmware.com/solutions/desktop/, printed Oct. 12, 2009, 1 page.
Secure Mobile Computing, Website: http://www.vmware.com/solutions/desktop/mobile.html, printed Oct. 12, 2009, 2 pages.
Barrantes et al., "Randomized Instruction Set Emulation to Dispurt Binary Code Injection Attacks," Oct. 27-31, 2003, ACM, pp. 281-289.
Gaurav et al., "Countering Code-Injection Attacks with Instruction-Set Randomization," Oct. 27-31, 2003, ACM, pp. 272-280.
Check Point Software Technologies Ltd.: "ZoneAlarm Security Software User Guide Version 9", Aug. 24, 2009, XP002634548, 259 pages, retrieved from Internet: URL:http://download.zonealarm.com/bin/media/pdf/zaclient91_user_manual.pdf.
Notification of Transmittal of the International Search Report and the Written Opinion of the International Searching Authority (1 page), International Search Report (4 pages), and Written Opinion (3 pages), dated Mar. 2, 2011, International Application No. PCT/US2010/055520.
Notification of Transmittal of the International Search Report and the Written Opinion of the International Searching Authority, or the Declaration (1 page), International Search Report (6 pages), and Written Opinion of the International Searching Authority (10 pages) for International Application No. PCT/US2011/020677 dated Jul. 22, 2011.
Notification of Transmittal of the International Search Report and Written Opinion of the International Searching Authority, or the Declaration (1 page), International Search Report (3 pages), and Written Opinion of the International Search Authority (6 pages) for International Application No. PCT/US2011/024869 dated Jul. 14, 2011.
Tal Garfinkel, et al., "Terra: A Virtual Machine-Based Platform for Trusted Computing," XP-002340992, SOSP'03, Oct. 19-22, 2003, 14 pages.
IA-32 Intel® Architecture Software Developer's Manual, vol. 3B; Jun. 2006; pp. 13, 15, 22 and 145-146.
Notification of International Preliminary Report on Patentability and Written Opinion dated May 24, 2012 for International Application No. PCT/US2010/055520, 5 pages.
Sailer et al., sHype: Secure Hypervisor Approach to Trusted Virtualized Systems, IBM research Report, dated Feb. 2, 2005, 13 pages.
Kurt Gutzmann, "Access Control and Session Management in the HTTP Environment," Jan./Feb. 2001, pp. 26-35, IEEE Internet Computing.
"Apache Hadoop Project," http://hadoop.apache.org/, retrieved and printed Jan. 26, 2011, 3 pages.
"Cbl, composite blocking list," http://cbl.abuseat.org, retrieved and printed Jan. 26, 2011, 8 pages.
A Tutorial on Clustering Algorithms, retrieved Sep. 10, 2010 from http://home.dei.polimi.it/matteucc/clustering/tutorial.html, 6 pages.
A. Pitsillidis, K. Levchenko, C. Kreibich, C. Kanich, G.M. Voelker, V. Pason, N. Weaver, and S. Savage, "Botnet Judo: Fighting Spam with Itself," in Proceedings of the 17th Annual Network and Distributed System Security Symposium (NDSS'10), Feb. 2010, 19 pages.
A. Ramachandran, N. Feamster, and D. Dagon, "Revealing botnet membership using DNSBL counter-intelligence," in Proceedings of the 2nd USENIX Steps to Reducing Unwanted Traffic on the Internet, 2006, 6 pages.
A. Ramachandran, N. Feamster, and S. Vempala, "Filtering Spam with Behavioral Blacklisting," in *Proceedings of ACM Conference on Computer Communications Security*, 2007, 10 pages.
B. Stone-Gross, M. Cova, L. Cavallor, B. Gilbert, M. Szydlowski, R. Kemmerer, C. Kruegel, and G. Vigna, "Your Botnet is My Botnet: Analysis of a Botnet Takeover," in Proceedings of the 16th ACM Conference on Computer and Communicatinos Security, 2009, 13 pages.
C. Kanich, C. Kreibich, K. Levchenko, B. Enright, G.M. Voelker, V. Paxson, and S. Savage, "Spamalytics: An Empirical Analysis of Spam Marketing Conversion," in Proceedings of the 15th ACM conference on Computer and Communications Security, 2008, 12 pages.
C.J. Burges, "A Tutorial on Support Vector Machines for Pattern Recognition," in *Journal of Data Mining and Knowledge Discovery*, 1998, 43 pages.
E-Mail Spamming Botnets: Signatures and Characteristics, Posted Sep. 22, 2008, http://www.protofilter.com/blog/email-spam-botnets-signatures.html, retrieved and printed Feb. 2, 2011, 4 pages.
G. Gu, J. Zhang, and W. Lee, "BotSniffer: Detecting Botnet Command and Control Channels in Network Traffic," in Proceedings of the 15th Annual Network and Distributed System Security Symposium (NDSS'08), Feb. 2008, 24 pages.
G. Gu, P. Porras, V. Yegneswaran, M. Fong, and W. Lee, "BotHunter: Detecting Malware Infection Through IDS-Driven Dialog Correlation," in Proceedings of the 16th USNIX Security Symposium, 2007, 34 pages.
G. Gu, R. Perdisci, J. Zhang, and W. Lee, "BotMiner: Clustering Analysis of Network Traffic for Protocol and Structure—Independent Botnet Detection," in Proceedings of the 17th USENIX Security Symposium, 2008, 15 pages.
I. Jolliffe, "Principal Component Analysis," in *Springer Series in Statistics, Statistical Theory and Methods, 2nd ed.*), 2002, 518 pages.
J. Dean and S. Ghemawat, "MapReduce: Simplified Data Processing on Large Clusters," in *Proceedings of Sixth Symposium on Operating System Design and Implementation, OSDI*, 2004, 13 pages.
J. Goebel and T. Holz, "Rishi: Identify Bot Contaminated Hosts by IRC Nickname Evaluation," in *Proceedings of the USENIX HotBots*, 2007, 12 pages.
J.B. Grizzard, V. Sharma, C. Nunnery, B.B. Kang, and D. Dagon, "Peer-to-Peer Botnets: Overview and Case Study," in Proceedings of the 1st Workshop on Hot Topics in Understanding Botnets, Apr. 2007, 14 pages.
J.P. John, A. Moshchuk, S.D. Gribble, and A. Krishnamurthy, "Studying Spamming Botnets Using Botlab," in Proceedings of the 6th USENIX Symposium on Networked Systems Design and Implementation, 2009, 16 pages.
K. Li, Z. Zhong, and L. Ramaswamy, "Privacy-Aware Collaborative Spam Filtering," in *Journal of IEEE Transactions on Parallel and Distributed Systems*, vol. 29, No. 5, May 2009, pp. 725-739.
L. Zhuang, J. Dunagan, D.R. Simon, H.J. Wang, and J.D. Tygar, "Characterizing botnets from email spam records," in Proceedings of the 1st Usenix Workshop on Large-Scale Exploits and Emergent Threats), 2008, 18 pages.
M. Frigo and S.G. Johnson, "The Design and Implementation of FFTW3," in Proceedings of the IEEE 93(2), Invited paper, Special Issue on Program Generation, Optimization, and Platform Adaptation, 2005, 16 pages.
R. Perdisci, I. Corona, D. Dagon, and W. Lee, "Detecting Malicious Flux Service Networks through Passive Analysis of Recursive DNS Traces," in Proceedings of the 25th Annual Computer Security Applications Conference (ACSAC 2009), Dec. 2009, 10 pages.
X. Jiang, D. Xu, and Y.-M. Wang, "Collapsar: A VM-Based Honeyfarm and Reverse Honeyfarm Architecture for Network Attack Capture

(56) References Cited

OTHER PUBLICATIONS and Detention," in Journal of Parallel and Distributed Computing, Special Issue on Security in Grid and Distributed Systems, 2006, 16 pages.
Y. Tang, S. Krasser, P. Judge, and Y.-Q. Zhang, "Fast and Effective Spam Sender Detection with Granular SVM on Highly Imbalanced Mail Server Behavior Data," in Proceedings of 2nd International Conference on Collaborative Computing: Networking, Applications and Worksharing (CollaborativeCom), Nov. 2006, 6 pages.
Y. Zhao, Y. Xie, F. Yu, Q. Ke, Y. Yu, Y. Chen, and E. Gillum, "BotGraph: Large Scale Spamming Botnet Detection," in Proceedings of the 6th USENIX Symposium on Networked Systems Design and Implementation, 2009, 26 pages.
Yinglian Xie, Fang Yu, Kannan Achan, Rina Panigraphy, Geoff Hulten, and Ivan Osipkov, "Spamming Botnets: Signatures and Characteristics," SIGCOMM '08, Aug. 17, 22, 2008, http://ccr.sigcomm.org/online/files/p171-xie.pdf, pp. 171-182.
Z. Li, A. Goyal, Y. Chen, and V. Paxson, "Automating Analysis of Large-Scale Botnet probing Events," in Proceedings of ACM Symposium on Information, Computer and Communications Security (ASIACCS)), 2009, 12 pages.
Myung-Sup Kim et al., "A load cluster management system using SNMP and web", [Online], May 2002, pp. 367-378, [Retrieved from Internet on Oct. 24, 2012], <http://onlinelibrary.wiley.com/doi/10.1002/nem.453/pdf>.
G. Pruett et al., "BladeCenter systems management software", [Online], Nov. 2005, pp. 963-975, [Retrieved from Internet on Oct. 24, 2012], <http://citeseerx.lst.psu.edu/viewdoc/download?doi=10.1.1.91.5091&rep=rep1&type=pdf>.
Philip M. Papadopoulos et al., "NPACI Rocks: tools and techniques for easily deploying manageable Linux clusters" [Online], Aug. 2002, pp. 707-725, [Retrieved from internet on Oct. 24, 2012], <http://onlinelibrary.wiley.com/doi/10.1002/cpe.722/pdf>.
Thomas Staub et al., "Secure Remote Management and Software Distribution for Wireless Mesh Networks", [Online], Sep. 2007, pp. 1-8, [Retrieved from Internet on Oct. 24, 2012], <http://cds.unibe.ch/research/pub_files/B07.pdf>.
"What's New: McAfee VirusScan Enterprise, 8.8," copyright 2010, retrieved on Nov. 23, 2012 at https://kc.mcafee.com/resources/sites/MCAFEE/content/live/PRODUCT_DOCUMENTATION/22000/PD22973/en_US/VSE%208.8%20-%20What's%20New.pdf, 4 pages.
"McAfee Management for Optimized Virtual Environments," copyright 2012, retrieved on Nov. 26, 2012 at AntiVirushttp://www.mcafee.com/us/resources/data-sheets/ds-move-anti-virus.pdf, 2 pages.
Rivest, R., "The MD5 Message-Digest Algorithm", RFC 1321, Apr. 1992, retrieved on Dec. 14, 2012 from http://www.ietf.org/rfc/rfc1321.txt, 21 pages.
Hinden, R. and B. Haberman, "Unique Local IPv6 Unicast Addresses", RFC 4193, Oct. 2005, retrieved on Nov. 20, 2012 from http://tools.ietf.org/pdf/rfc4193.pdf, 17 pages.
"Secure Hash Standard (SHS)", Federal Information Processing Standards Publication, FIPS PUB 180-4, Mar. 2012, retrieved on Dec. 14, 2012 from http://csrc.nist.gov/publications/fips/fips180-4/fips-180-4.pdf, 35 pages.
An Analysis of Address Space Layout Randomization on Windows Vista™, Symantec Advanced Threat Research, copyright 2007 Symantec Corporation, available at http://www.symantec.com/avcenter/reference/Address_Space_Layout_Randomization.pdf, 19 pages.
Bhatkar, et al., "Efficient Techniques for Comprehensive Protection from Memory Error Exploits," USENIX Association, 14th USENIX Security Symposium, Aug. 1-5, 2005, Baltimore, MD, 16 pages.
Dewan, et al., "A Hypervisor-Based System for Protecting Software Runtime Memory and Persistent Storage," Spring Simulation Multiconference 2008, Apr. 14-17, 2008, Ottawa, Canada, (available at website: www.vodun.org/papers/2008_secure_locker_submit_v1-1.pdf, printed Oct. 11, 2011), 8 pages.
Shacham, et al., "On the Effectiveness of Address-Space Randomization," CCS'04, Oct. 25-29, 2004, Washington, D.C., Copyright 2004, 10 pages.
International Search Report and Written Opinion dated Dec. 14, 2012 for International Application No. PCT/US2012/055674, 9 pages.
International Preliminary Report on Patentability and Written Opinion dated Jan. 29, 2013 for International Application No. PCT/US2011/020677 (9 pages).
International Preliminary Report on Patentability and Written Opinion dated Jan. 29, 2013 for International Application No. PCT/US2011/024869 (6 pages).
USPTO dated Jun. 5, 2013 Notice of Allowance from U.S. Appl. No. 11/437,317, 8 pages.
USPTO dated Jun. 10, 2013 Notice of Allowance from U.S. Appl. No. 12/976,159, 9 pages.
Office Action received for U.S. Appl. No. 12/844,892, dated Jan. 17, 2013, 29 pages.
Office Action received for U.S. Appl. No. 12/844,892, dated Sep. 6, 2012, 33 pages.
Datagram Transport Layer Security Request for Comments 4347, E. Rescorla, et al., Stanford University, Apr. 2006, retrieved and printed on Oct. 17, 2011 from http://tools.ietf.org/pdf/rfc4347.pdf, 26 pages.
Internet Control Message Protocol Request for Comments 792, J. Postel, ISI, Sep. 1981, retrieved and printed on Oct. 17, 2011 from http://tools.ietf.org/html/rfc792, 22 pages.
Mathew J. Schwartz, "Palo Alto Introduces Security for Cloud, Mobile Users," retrieved Feb. 9, 2011 from http://www.informationweek.com/news/security/perimeter/showArticle.jhtml?articleID=22, 4 pages.
Requirements for IV Version 4 Routers Request for Comments 1812, F. Baker, Cisco Systems, Jun. 1995, retrieved and printed on Oct. 17, 2011 from http://tools.ietf.org/pdf/rfc1812.pdf, 176 pages.
The Keyed-Hash Message Authentication Code (HMAC), FIPS PUB 198, Issued Mar. 6, 2002, Federal Information Processing Standards Publication, retrieved and printed on Oct. 17, 2011 from http://csrc.nist.gov/publications/fips/fips198/fips-198a.pdf, 20 pages.
Zhen Chen et al., "Application Level Network Access Control System Based on TNC Architecture for Enterprise Network," In: Wireless communications Networking and Information Security (WCNIS), 2010 IEEE International Conference, Jun. 25-27, 2010 (5 pages).
USPTO Dec. 24, 2012 Nonfinal Office Action from U.S. Appl. No. 13/032,851.
USPTO Jul. 16, 2013 Final Office Action from U.S. Appl. No. 13/032,851.
International Search Report and Written Opinion, International Application No. PCT/US2012/026169, dated Jun. 18, 2012, 11 pages.
USPTO Feb. 28, 2013 Nonfinal Office Action from U.S. Appl. No. 13/275,249.
International Search Report and Written Opinion, International Application No. PCT/US2012/057312, dated Jan. 31, 2013, 10 pages.
USPTO Mar. 1, 2013 Nonfinal Office Action from U.S. Appl. No. 13/275,196.
International Search Report and Written Opinion, International Application No. PCT/US2012/057153, dated Dec. 26, 2012, 8 pages.
USPTO Mar. 1, 2013 Nonfinal Office Action from U.S. Appl. No. 13/437,900.
USPTO Sep. 13, 2013 Final Office Action from U.S. Appl. No. 13/275,249, 21 pages.
Narten et al., RFC 4861, "Neighbor Discovery for IP version 6 (IPv6)", Sep. 2007, retrieved from http://tools.ietf.org/html/rfc4861, 194 pages.
International Preliminary Report on Patentability, International Application No. PCT/US2012/026169, dated Aug. 27, 2013, 8 pages.
USPTO Oct. 2, 2013 Final Office Action from U.S. Appl. No. 13/275,196, 21 pages.
USPTO Oct. 4, 2013 Nonfinal Office Action from U.S. Appl. No. 12/844,892.
USPTO Oct. 25, 2013 Nonfinal Office Action from U.S. Appl. No. 12/844,964, 39 pages.

(56) References Cited

OTHER PUBLICATIONS

Citrix, CTX 115813—FAX: XenMotion, Live Migration—Citrix Knowledge Center, copyright 1999-2012 Citrix Systems, Inc., retrieved from http://support/citrix.com/article/CTX115813 on Aug. 7, 2012, 2 pages.
Citrix® , Citrix Synchronizer™ 1.0 RC Administrator Guide, Published May 11, 2010, copyright 2009 Citrix, 32 pages.
PCT Application Serial No. PCT/US13/66690, filed Oct. 24, 2013, entitled "Agent Assisted Malicious Application Blocking in a Network Environment,", 67 pages.
Patent Examination Report No. 1, Australian Application No. 2011283160, dated Oct. 30, 2013, 3 pages.
PCT Application Serial No. PCT/US13/71327, filed Nov. 21, 2013, entitled "Herd Based Scan Avoidance System in a Network Environment,", 46 pages.
USPTO Dec. 4, 2013 Nonfinal Office Action from U.S. Appl. No. 13/032,851.
USPTO Dec. 26, 2013 Notice of Allowance from U.S. Appl. No. 13/275,249, 32 pages.
USPTO Dec. 16, 2013 Notice of Allowance from U.S. Appl. No. 13/275,196, 11 pages.
USPTO Jan. 13, 2014 Notice of Allowance from U.S. Appl. No. 13/437,900, 30 pages.
Patent Examination Report No. 1, Australian Application No. 2011283164, dated Jan. 14, 2014, 6 pages.
USPTO Dec. 30, 2013 Final Office Action from U.S. Appl. No. 13/629,765, 9 pages.
USPTO Feb. 24, 2014 Notice of Allowance from U.S. Appl. No. 13/629,765, 8 pages.
USPTO Mar. 24, 2014 Notice of Allowance from U.S. Appl. No. 13/275,196, 9 pages.
International Search Report and Written Opinion, International Application No. PCT/US2013/071327, dated Mar. 7, 2014, 12 pages.
USPTO Apr. 15, 2014 Notice of Allowance from U.S. Appl. No. 12/844,892, 9 pages.
U.S. Appl. No. 14/257,770, entitled "Enforcing Alignment of Approved Changes and Deployed Changes in the Software Change Life-Cycle," filed Apr. 21, 2014, Inventors: Rahul Roy-Chowdhury et al., 56 pages.
International Preliminary Report on Patentability in International Application No. PCT/US2012/057312, dated Apr. 22, 2014, 5 pages.
International Preliminary Report on Patentability in International Application No. PCT/US2012/057153, dated Apr. 22, 2014, 4 pages.
USPTO Jun. 6, 2014 Final Office Action from U.S. Appl. No. 12/844,964, 30 pages.
USPTO Jun. 4, 2014 Notice of Allowance from U.S. Appl. No. 13/032,851, 16 pages.
"Optical stateful security filtering approach based on code words," Sliti, M.; Boudriga, N., 2013 IEEE Symposium on Computers and Communications (ISCC), 10 pages.
Rothenberg, et al., "A Review of Policy-Based Resource and Admission Control Functions in Evolving Access and Next Generation Networks," Journal of Network and Systems Management, 16.1 (2008) 14-45, 32 pages.
USPTO Jun. 4, 2014 Nonfinal Office Action from U.S. Appl. No. 13/728,705, 16 pages.
Jun. 2, 2014 Office Action in Korean Patent Appln. No. 2013-7022241, [English translation], 6 pages.
USPTO Aug. 11, 2014 Notice of Allowance from U.S. Appl. No. 12/844,892, 8 pages.
International Search Report and Written Opinion in International Application No. PCT/US2013/066690, dated Jul. 10, 2014, 12 pages.
Aug. 12, 2014 Office Action in Japanese Patent Application No. 2013-555531, English translation, 3 pages.
USPTO Sep. 10, 2014 Final Office Action from U.S. Appl. No. 13/229,502, 18 pages.
USPTO Sep. 11, 2014 Notice of Allowance from U.S. Appl. No. 12/844,964, 10 pages.
USPTO Oct. 27, 2014 Notice of Allowance from U.S. Appl. No. 13/728,705, 25 pages.
Muttik, Igor, and Chris Barton, "Cloud security technologies," Information security technical report 14.1 (2009), 1-6, 6 pages.
Nov. 13, 2014 Office Action in Japanese Patent Application No. 2013-521770, English translation, 2 pages.
Patent Examination Report No. 1, Australian Application No. 20122220642, dated Nov. 5, 2014, 3 pages.
Notice of Allowance received for Korean Patent Application No. 10-2013-7022241, dated Dec. 12, 2014, 3 pages.
Extended European Search Report in Application No. 12842144.3-1853/2769509 PCT/US2012/057312, dated Feb. 6, 2015, 6 pages.
Notice of Reasons for Refusal in Japanese Patent Application No. JP 2013-521767, dated Feb. 17, 2015, 5 pages of English language translation, 4 pages of Japanese language Office Action.
Baba, Tatsuya, et al., "A Proposal of an Integrated Worm Countermeasure System Based on Dynamic VLAN Control," Journal of Information Processing Society of Japan, Japan, Information Processing Society of Japan, Aug. 15, 2006, vol. 47, No. 8, pp. 2449-2511, 14 pages, English language Abstract only.
Fujita, Keisuke, et al., "Proposal of DF system with boot control function against unauthorized programs," Transactions of Computer Security Symposium 2007, Japan, Information Processing Society of Japan, Oct. 31, 2007, vol. 2007, No. 10, pp. 501-506, 7 pages, English language Abstract only.
Ashiwa, Takashi, "IT Keyword too late to ask: Bot," Nikkei Computer, Japan, Nikkei Business Publications, Oct. 30, 2006, No. 664, pp. 244-249, 14 pages, 7 pages of English translation.
Feb. 27, 2015 Office Action in Japanese Patent Application No. 2013-521770, English translation, 3 pages.
Mar. 2, 2015 Office Action in Korean Patent Appln. No. 2014-7021824, English translation, 4 pages.
Oct. 27, 2014 Office Action in EP Application No. 11 703 741.6-1870, 6 pages.
Feb. 28, 2015 Office Action in CN Application No. 2011800469004, English translation, 29 pages.
Mar. 23, 2015 Office Action in CN Application No. 201180046850X, English translation, 38 pages.
USPTO May 28, 2015 Nonfinal Rejection from U.S. Appl. No. 14/583,509, 17 pages.
Apr. 20, 2015 Office Action in Japanese Patent Appln. No. 2013-555531, [English translation], 2 pages.
Apr. 29, 2015 Supplementary European Search Report in EP Application No. EP 12 84 12254, 7 pages.
Cheneau, Tony, et al., "Significantly improved performances of the cryptographically generated addresses thanks to ECC and GPGPU," Computers & Security, vol. 29, No. 4, Jun. 2010 (Jun. 2010), pp. 419-431, 13 pages.
USPTO Jul. 6, 2015 Nonfinal Rejeicition from U.S. Appl. No. 14/127,395, 32 pages.
USPTO Jul. 16, 2015 Corrected Notice of Allowability in U.S. Appl. No. 13/032,851, 3 pages.
International Preliminary Report on Patentability, International Application No. PCT/US2013/071327, dated Jul. 9, 2015, 11 pages.
USPTO Aug. 12, 2015 Nonfinal Rejection from U.S. Appl. No. 14/262,164, 33 pages.
USPTO Sep. 29, 2015 Notice of Allowance from U.S. Appl. No. 14/583,509, 31 pages.
USPTO Oct. 19, 2015, Notice of Allowance from U.S. Appl. No. 14/263,164, 13 pages.
Decision to Grant a Patent in Japanese Patent Application No. JP 2013-521767, dated Oct. 22, 2015, 3 pages of English language translation.
Sep. 8, 2015 Office Action in Japanese Patent Application No. 2013-555531, English translation, 2 pages.
Office Action in CN 201180046900.4, dated Nov. 3, 2015, English translation, 29 pages.
USPTO Nov. 6, 2015 Nonfinal Rejection from U.S. Appl. No. 14/277,954, 32 pages.
USPTO Nov. 23, 2015 Nonfinal Rejection from U.S. Appl. No. 14/599,811, 27 pages.

(56) References Cited

OTHER PUBLICATIONS

Nov. 20, 2015 Office Action in CN Application No. 201180046850X, English translation, 36 pages.
Nov. 20, 2015 Office Action in CN Application No. 20120050877.0, English translation, 5 pages.
Nov. 13, 2015 Office Action in CN Application No. 201280010062. X, English translation, 5 pages.
USPTO Dec. 2, 2015 Notice of Allowance from U.S. Appl. No. 14/127,395, 7 pages.
USPTO Mar. 11, 2016 Notice of Allowance from U.S. Appl. No. 14/583,509, 32 pages.
Mar. 9, 2016 Office Action in CN Application No. 201180046900.4, English translation, 11 pages.
USPTO Apr. 5, 2016 Notice of Allowance from U.S. Appl. No. 14/277,954, 16 pages.
Apr. 8, 2016 Office Action in EP Application No. 11 710 915.7, 5 pages.
Feb. 25, 2016 Office Action in CN Application No. 201280053580. X, English translation, 16 pages.
International Preliminary Report on Patentability in International Application No. PCT/US2013/066690, dated Apr. 26, 2016, 8 pages.
USPTO Jun. 6, 2016 Notice of Allowance from U.S. Appl. No. 14/127,395, 40 pages.
USPTO Jun. 6, 2016 Final Rejection from U.S. Appl. No. 14/599,811, 66 pages.
May 24, 2016 Office Action in CN Application No. 201280050877. 0, no English translation, 3 pages.
Jul. 5, 2016 Office Action in CN Application No. 201280010062.X, no English translation, 8 pages.
Aug. 11, 2016 Office Action in CN Application No. 2011800469004, with English translation, 29 pages.
Jun. 16, 2016 Reasons for Refusal in JP Application No. 2015-133517, with English translation, 8 pages.
Sep. 12, 2016 Office Action in CN Application No. 201280050877. 0, no English translation, 3 pages.
USPTO Sep. 29, 2016 Notice of Allowance from U.S. Appl. No. 14/127,395, 12 pages.
USPTO Oct. 6, 2016 Nonfinal Rejection from U.S. Appl. No. 15/168,004, 18 pages.
Binde, Beth et al., "Assessing Outbound Traffic to Uncover Advanced Persistent Threat," SANS Technology Institute, Published May 22, 2011, pp. 1-35, 35 pages.
Foresti, Stefano et al., "Visual Correlation of Network Alerts," Visualization for Cybersecurity, Published 2006, pp. 1-12, 12 pages.
USPTO Oct. 26, 2016 Notice of Allowance from U.S. Appl. No. 14/599,811, 9 pages.
USPTO Nov. 25, 2016 Nonfinal Rejection from U.S. Appl. No. 14/827,396, 15 pages.
Nov. 15, 2016 Office Action in CN Application No. 201280053580. X, with English translation, 7 pages.
Dec. 28, 2016 Decision to Grant in JP Application No. 2015-133517, no English translation, 3 pages.
U.S. Appl. No. 15/417,334, filed Jan. 27, 2017, entitled "Execution Environment File Inventory," Inventors: Rishi Bhargava, et al., 44 pages.
Communication re EP Application No. 12 706 424.4, dated Feb. 3, 2017, 6 pages.
USPTO Apr. 17, 2017 Final Rejection from U.S. Appl. No. 15/168,004, 41 pages.
Supplementary European Search Report in EP Application No. 13 89 5997, dated Mar. 21, 2017, 7 pages.
USPTO Apr. 14, 2017 Notice of Allowance from U.S. Appl. No. 14/599,811, 13 pages.
Notice of Reasons for Rejection in JP Application No. 2016-001060, dated Feb. 7, 2017, with English translation, 3 pages.
Mar. 7, 2017 Notice of Granting Patent Right for Invention in CN Application No. 201280053580.X, with English translation, 3 pages.
USPTO May 22, 2017 Notice of Allowance from U.S. Appl. No. 14/827,396, 35 pages.

U.S. Appl. No. 11/277,596, filed Mar. 27, 2006, now issued as U.S. Pat. No. 7,895,573,
U.S. Appl. No. 13/022,148, filed Feb. 7, 2011, now abandoned.
U.S. Appl. No. 14/045,208, filed Oct. 3, 2013.
U.S. Appl. No. 10/651,588, filed Aug. 29, 2003, now issued as U.S. Pat. No. 7,464,408.
U.S. Appl. No. 10/739,230, filed Dec. 17, 2003, now issued as U.S. Pat. No. 7,840,969.
U.S. Appl. No. 12/903,993, filed Oct. 13, 2010, now issued as U.S. Pat. No. 8,561,082.
U.S. Appl. No. 12/646,081, filed Nov. 15, 2010, now issued as U.S. Pat. No. 8,549,546.
U.S. Appl. No. 12/946,344, filed Nov. 15, 2010, now issued as U.S. Pat. No. 8,762,925.
U.S. Appl. No. 10/935,772, filed Sep. 7, 2004, now issued as U.S. Pat. No. 7,873,955.
U.S. Appl. No. 12/976,159, filed Dec. 22, 2010, now issued as U.S. Pat. No. 8,561,051.
U.S. Appl. No. 10/060,683, filed Feb. 16, 2005, now abandoned Oct. 2, 2014.
U.S. Appl. No. 11/122,872, filed May 4, 2005, now issued as U.S. Pat. No. 7,603,552.
U.S. Appl. No. 12/551,673, filed Sep. 1, 2009, now issued as U.S. Pat. No. 8,028,340.
U.S. Appl. No. 11/346,741, filed Feb. 2, 2006, now issued as U.S. Pat. No. 7,757,269.
U.S. Appl. No. 12/640,098, filed Dec. 17, 2009, now issued as U.S. Pat. No. 8,234,713.
U.S. Appl. No. 13/540,448, filed Jul. 2, 2012, now issued as U.S. Pat. No. 8,707,446.
U.S. Appl. No. 14/257,770, filed Apr. 21, 2014, now issued as U.S. Pat. No. 9,134,998.
U.S. Appl. No. 14/848,522, filed Sep. 9, 2015.
U.S. Appl. No. 11/182,320, filed Jul. 14, 2005, now issued as U.S. Pat. No. 7,856,661.
U.S. Appl. No. 12/944,567, filed Nov. 11, 2010, now issued as U.S. Pat. No. 8,307,437.
U.S. Appl. No. 13/629,765, filed Sep. 28, 2012, now issued as U.S. Pat. No. 8,763,118 .
U.S. Appl. No. 11/400,085, filed Apr. 7, 2006, now issued as U.S. Pat. No. 7,870,387.
U.S. Appl. No. 12/975,745, filed Dec. 22, 2010, now issued as U.S. Pat. No. 8,321,932.
U.S. Appl. No. 11/437,317, filed May 18, 2006, now issued as U.S. Pat. No. 8,555,404.
U.S. Appl. No. 12/290,380, filed Oct. 29, 2008, now issued as U.S. Pat. No. 8,195,931.
U.S. Appl. No. 12/008,274, filed Jan. 9, 2008, now issued as U.S. Pat. No. 8,332,929.
U.S. Appl. No. 13/558,181, filed Jul. 25, 2012, now issued as U.S. Pat. No. 8,701,182.
U.S. Appl. No. 14/251,009, filed Apr. 11, 2014.
U.S. Appl. No. 13/558,227, filed Jul. 25, 2012, now issued as U.S. Pat. No. 8,707,422.
U.S. Appl. No. 13/558,277, filed Jul. 25, 2014, now abandoned Sep. 15, 2014.
U.S. Appl. No. 12/291,232, filed Nov. 7, 2008.
U.S. Appl. No. 12/844,892, filed Jul. 28, 2010, now issued as U.S. Pat. No. 8,925,101.
U.S. Appl. No. 14/583,509, filed Dec. 26, 2014.
U.S. Appl. No. 12/844,964, filed Jul. 28, 2010, now issued as U.S. Pat. No. 8,938,800.
U.S. Appl. No. 14/599,811, filed Jan. 19, 2015.
U.S. Appl. No. 13/229,502, filed Sep. 9, 2011.
U.S. Appl. No. 13/032,851, filed Feb. 23, 2011, now issued as U.S. Pat. No. 9,112,830.
U.S. Appl. No. 14/827,396, filed Aug. 17, 2015.
U.S. Appl. No. 12/545,609, filed Aug. 21, 2009, now issued as U.S. Pat. No. 8,381,284.
U.S. Appl. No. 13/723,445, filed Dec. 21, 2012, now issued as U.S. Pat. No. 8,869,265.
U.S. Appl. No. 13/275,249, filed Oct. 17, 2011, now issued as U.S. Pat. No. 8,713,668.

(56) References Cited

OTHER PUBLICATIONS

U.S. Appl. No. 14/263,164, filed Apr. 25, 2014.
U.S. Appl. No. 13/437,900, filed Apr. 2, 2012, now issued as U.S. Pat. No. 8,739,272.
U.S. Appl. No. 14/277,954, filed May 15, 2014.
U.S. Appl. No. 13/275,196, filed Oct. 17, 2011, now issued as U.S. Pat. No. 8,800,024.
U.S. Appl. No. 13/728,705, filed Dec. 27, 2012, now issued as U.S. Pat. No. 8,973,146.
U.S. Appl. No. 14/127,395, filed Dec. 18, 2013.
U.S. Appl. No. 14/045,208, filed Oct. 3, 2013, now issued as U.S. Pat. No. 9,576,142.
U.S. Appl. No. 15/417,334, filed Jan. 27, 2017.
U.S. Appl. No. 14/848,522, filed Sep. 9, 2015, now issued as U.S. Pat. No. 9,602,515.
U.S. Appl. No. 15/251,009, filed Apr. 11, 2014.
U.S. Appl. No. 12/291,232, filed as Nov. 7, 2008, now issued as U.S. Pat. No. 9,424,154.
U.S. Appl. No. 14/583,509, filed Dec. 26, 2014, now issued as U.S. Pat. No. 9,467,470.
U.S. Appl. No. 13/229,502, filed Sep. 9, 2011, now issued as U.S. Pat. No. 9,594,881.
U.S. Appl. No. 14/263,164, filed Apr. 25, 2014, now issued as U.S. Pat. No. 9,356,909.
U.S. Appl. No. 14/277,954, filed May 15, 2014, now issued as U.S. Pat. No. 9,413,785.
U.S. Appl. No. 14/127,395, filed Dec. 18, 2013, now issued as U.S. Pat. No. 9,578,052.
U.S. Appl. No. 15/399,094, filed Jan. 5, 2017.
U.S. Appl. No. 15/168,004, filed May 28, 2016.
U.S. Appl. No. 15/399,091, filed Jan. 5, 2017.

\* cited by examiner

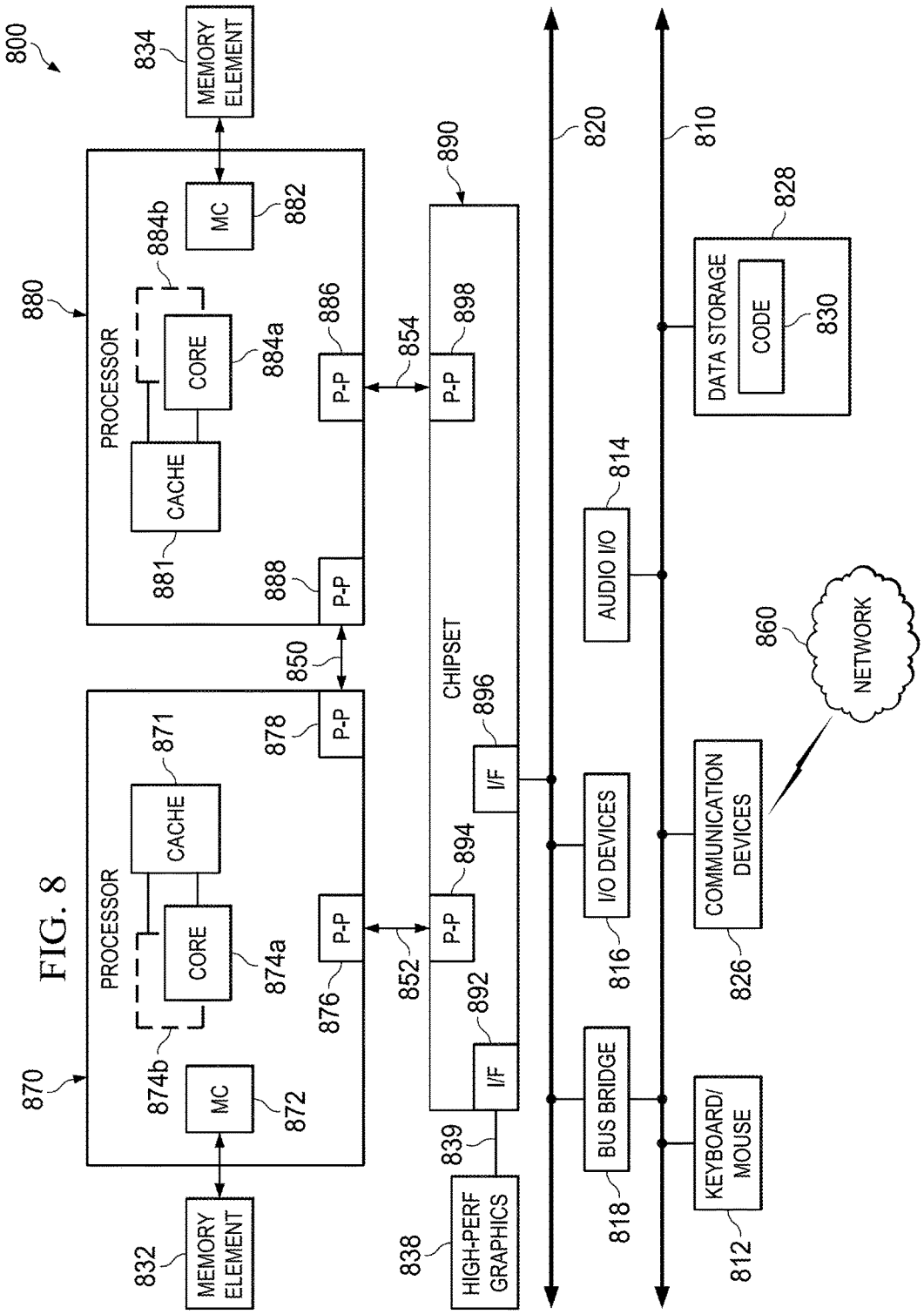

HERD BASED SCAN AVOIDANCE SYSTEM IN A NETWORK ENVIRONMENT

CROSS-REFERENCE TO RELATED APPLICATIONS

This application is a continuation (and claims the benefit under 35 U.S.C. § 120) of U.S. application Ser. No. 13/728,705, filed Dec. 27, 2012 and entitled "HERD BASED SCAN AVOIDANCE SYSTEM IN A NETWORK ENVIRONMENT." The disclosure of the prior application is considered part of, and is incorporated by reference in, the disclosure of this application.

TECHNICAL FIELD y be disclosure relates in general to the field of computer networks and communication and, more particularly, to a herd based scan avoidance system in a network environment.

BACKGROUND

The field of computer network security has become increasingly important and complicated in today's society. Computer network environments are configured for virtually every enterprise or organization, typically with multiple interconnected computers (e.g., end user computers, laptops, servers, mobile devices, etc.). In many such enterprises, Information Technology (IT) administrators may be tasked with maintenance and control of the network environment, including executable software files and other objects on hosts, servers, and other computers. As the number of computers in a network environment increases, the ability to control, maintain, and remediate the executable software files on those computers efficiently can become more difficult.

Scanning executable software files and other objects is a technique that is often used to detect malware or other threats on a computer. Scanning, however, requires time and processing cycles, thus consuming valuable network resources. As the number of computers in a network environment increases, the need for network resources to manage security can escalate. Moreover, network resources may often be used to perform duplicative scans of the same objects on different network nodes. Thus, innovative tools are needed to provide effective security in computer networks, while minimizing the consumption of network resources to provide such security.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 8 is a simplified block diagram of an example computing system according to an embodiment.

DETAILED DESCRIPTION OF EXAMPLE EMBODIMENTS

Example Embodiments

Figure 1:
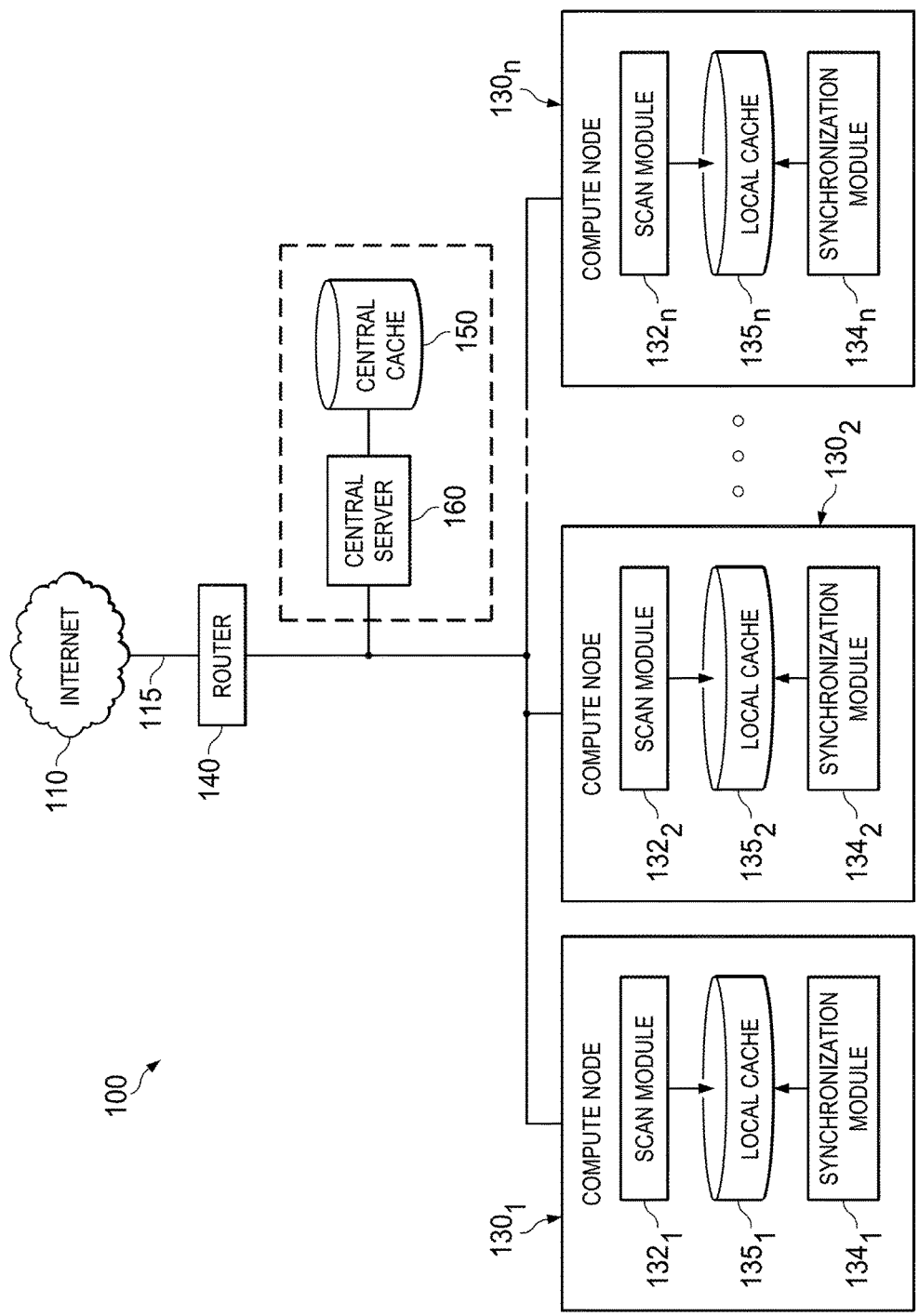
FIG. 1 is a simplified block diagram illustrating a communication system for herd based scan avoidance in a network environment, according to an example embodiment.

FIG. 1 is a simplified block diagram illustrating an example implementation of a communication system 100 for herd based scan avoidance. Compute nodes $130_1$ through $130_n$ can be provided in a network 115, which could be a local area network (LAN), an Intranet, or other network that provides access to Internet 110 and/or other networks. Network 115 can also include a router 120 that connects network 115 to other networks, such as Internet 110. Compute nodes $130_{1-n}$ can include respective scan modules $132_{1-n}$ and local caches $135_{1-n}$. In some embodiments, compute nodes $130_{1-n}$ may also include respective synchronization modules $134_{1-n}$. In some embodiments of communication system 100, a central server 160 may be provided in network 115 to facilitate herd based scan avoidance in network 115. In further embodiments, a central cache 165 may also be used for herd based scan avoidance. Alternatively, some embodiments of communication system 100 may not use additional network elements, such as central server 160 or central cache 165, to facilitate herd based scan avoidance.

Where appropriate herein, compute nodes $130_{1-n}$ are referred to collectively herein as 'compute nodes 130' and singularly as 'compute node 130' for ease of reference. Similarly, other elements in compute nodes $130_{1-n}$, such as scan modules $132_{1-n}$, synchronization modules $134_{1-n}$, and local caches $135_{1-n}$, may be similarly referenced where appropriate.

For purposes of illustrating the techniques of communication system 100, it is important to understand the activities and security concerns that may be present in a given network, such as network 115 shown in FIG. 1. The following foundational information may be viewed as a basis from which the present disclosure may be properly explained. Such information is offered for purposes of explanation only and, accordingly, should not be construed in any way to limit the broad scope of the present disclosure and its potential applications.

Downloadable and native software applications and other objects can present many security threats on devices in a computer network. Some objects may be specifically designed to be malicious, and some other objects may be easily exploited for malicious purposes. Security threats generally fit into one or more of the following categories: (1) malware; (2) spyware; (3) privacy threats; and (4) vulnerable applications. Malware includes software that is designed to engage in malicious, hostile, intrusive, unwanted, and/or unauthorized behavior on an electronic device. Examples of malware can include, but are not limited to, computer viruses, worms, bots, and Trojan horses. Malware is often designed to perform actions without a user's knowledge, such as making charges to a user's mobile device phone bill, sending unsolicited messages to a user's contact list, or giving an attacker remote control over the device. Malware can also be used to steal personal information from a device that could result in identity theft, financial fraud, or other invasions of privacy (e.g., personal medical information).

Spyware is software that is designed to collect or use data without a user's knowledge or approval. For example, spyware on a mobile device may automatically trigger a phone's camera or microphone, record conversations, record locations, etc. and send the information to a remote recipient. Privacy threats can be caused by applications that may not necessarily be malicious, but may gather or use information, without authorization, that is unnecessary to perform their primary functions. Examples of such information could include, but is not limited to, a user's location, contact lists, personally identifiable information, financial information, medical information, confidential or sensitive corporate data, etc. Vulnerable applications can contain software vulnerabilities that can be exploited for malicious purposes. For example, vulnerabilities can often allow an attacker to access sensitive information, perform undesirable actions, stop a service from functioning correctly, automatically download malicious software, or otherwise engage in undesirable behavior.

Various types of security solutions can be used to prevent malware attacks, to detect malware and other threats on computers, and/or to remediate computers when needed. For instance, signature based threat detection is a common antivirus technique that involves searching for known patterns of data within an object, such as an executable software file. In a typical scenario for evaluating an executable file in a compute node, a unique hash (i.e., signature) is created of the file. The hash can be compared to a current cache of hashes generated from scanned files of the node. If the hash is found in the cache, this indicates that the hash is known and further scanning of the file may not be performed. If the hash is not found in the cache, then the file may be scanned and results of scan added to the cache. The scan results can include a hash of the file and a result (i.e., a threat level or status) of the file. Similar operations may be performed to evaluate other objects such as web content of a Uniform Resource Locator (URL) received by a compute node, or other content received by the node.

Although scanning files for known malicious signatures and can be useful for detecting malware and other threats, scanning files can take time and processing cycles. In many network configurations, particularly home networks and small businesses, each compute node in the network may rely on host-based scanning. In host-based scanning, a host (or compute node) scans each new object it receives from external sources (e.g., USB, DVD, CD, Internet, local area network, etc.) and determines the object's status (i.e., threat level). Scan results may be cached or otherwise saved by the node to avoid future scans of the object by that particular compute node. Other compute nodes in the network, however, may not know about the scan results of the new object. Consequently, the other compute nodes may perform duplicative scanning when they receive the same object. Duplicative scanning can potentially degrade network performance, and can cause slower response times on certain compute nodes.

In some network configurations, a compute node may report scan results to a remote central intelligence system that subsequently updates the other compute nodes in the network, in addition to compute nodes in other networks. Generally, a central intelligence may update networks with new scan results at certain defined intervals of time (e.g., once per day). Thus, if a particular compute node scans a new object and reports its scan results to the central intelligence system, other compute nodes in the network may not receive updated information on the new object for a delayed period of time. In addition, duplicative scanning can still be problematic with the use of a remote central intelligence system.

Additionally, in this type of configuration, the security of each compute node is dependent on the topography of the network's connection to the central intelligence system. Any time a given network goes off-line, or the central intelligence system goes off-line, the network is no longer being updated with new threat information. Accordingly, scanning may be performed by every compute node that receives a new object, even when other compute nodes in the network have performed the same scan on the same object.

Balancing the need to protect computer network nodes from malware and the need to enhance network performance can be challenging. Avoiding detailed scanning of new objects for malware can directly improve performance. An undetected malware infection, however, could potentially have devastating consequences for a computer network. Thus, a system for sharing scan results of new objects within a network may be beneficial for protecting the network against security threats while not detrimentally affecting network performance.

The communication system for herd based scan avoidance of FIG. 1 resolves many of the aforementioned issues (and more). Scan results from multiple compute nodes in a network are aggregated to build a herd cache. The herd cache is a shared cache among a herd of compute nodes in the network. A 'herd' can be either all of the compute nodes in a given network or a selected group of compute nodes in the network. In an example embodiment, the compute nodes in the herd discover each other and then the herd cache can be replicated across the multiple compute nodes. The herd cache can contain the combined scan efforts of all compute nodes that form the herd. When a malware list is updated, any one node that determines an existing hash status against the new malware list, can replicate this information to all other nodes in the herd. Accordingly, an object may be scanned once by one compute node for all other nodes in the herd to know the status of the object. Because the nature of the shared cache is dynamic, the loss or addition of any particular compute node does not negatively affect the accuracy or usefulness of the shared cache.

In another example embodiment, a compute node searches a central cache when its local cache does not contain scan results of a new object. The compute node can scan the object if it is not found in the central cache and then update the central cache with the new object's scan results. In yet another embodiment, a compute node can contact a central server when it receives a new object that is not identified in its local cache. The central server can redirect the compute node to another compute node with scan results of the particular object. If none of the other compute nodes have scan results of the new object in their local caches, then the compute node can scan the object and notify the central server that it has scan results for the new object. Thus, in the various embodiments, the herd composition can maximize scan avoidance while minimizing synchronization overhead.

Turning to the infrastructure of FIG. 1, a brief description is provided about some of the possible infrastructure that may be included in communication system 100. Generally, communication system 100 can be implemented in any type or topology of networks. Network 115 and Internet 110 each represent a series of points or nodes of interconnected communication paths for receiving and transmitting packets of information that propagate through communication system 100. These networks offer a communicative interface between nodes, and may be configured as any local area network (LAN), virtual local area network (VLAN), wide area network (WAN), wireless local area network (WLAN), spoke and hub based network, metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 100. Suitable interfaces and infrastructure may be provided to enable communication with the cellular network.

The term 'data' as used herein, refers to any type of binary, numeric, voice, video, media, textual, or script data, or any type of source or object code, or any other suitable information in any appropriate format that may be communicated from one point to another in electronic devices and/or networks. An object is intended to include any software file or other data comprising instructions that can be understood and processed by a computer such as executable files, library modules, object code, source code, other executable modules, script files, interpreter files, etc. An object is also intended to include a file or other data corresponding to a uniform resource locator (URL).

Communication system 100 may be provided in networks that are owned or otherwise under the control of a particular entity or organization. An entity or organization could include, for example, a small business, corporation, government organization, educational organization, etc. In an example embodiment, network 115 may be a private network (e.g., LAN, Intranet, etc.) that uses private address space (e.g., Internet Protocol (IP) address space) for its nodes on the network. Private address space may follow standards set by Network Working Group, Requests for Comments (RFC) 1918, Y. Rekhter, et al., February 1996 and/or Network Working Group, Requests for Comments (RFC) 4193, R. Hinden, et al., October 2005. In other embodiments, network 115 may implement any other suitable forms of address spacing that allows an entity to control network communications to and from the network.

Router 140 and central server 160 are network elements that are meant to encompass routers, switches, gateways, bridges, loadbalancers, firewalls, inline service nodes, proxies, servers, appliances, processors, modules, or any other suitable device, component, element, proprietary device, or object operable to exchange information in a network environment. This network element may include any suitable hardware, software, components, modules, interfaces, or objects that facilitate the operations thereof. This may be inclusive of appropriate algorithms and communication protocols that allow for the effective exchange of data or information.

In a possible embodiment, communication system 100 includes central server 160, which may be a server, an appliance, or some other suitable network element for receiving scan results from compute nodes 130 and storing the scan results in central cache 165. Central cache 165 may be internal to central server 160 or external (entirely or in part) using, for example, some network storage technique such as network attached storage (NAS) or storage area network (SAN). Central cache 165 can store scan results from compute nodes 130 and maintain an updated cache of object signatures and a threat level associated with the signatures.

In another embodiment, central server 160 may simply maintain a list of which compute nodes contain scan results of which objects. In this embodiment, the central server can simply redirect compute node queries for scan results of a particular object to another compute node that has a local cache with a signature of the desired object. In yet other embodiments, communication system 100 may achieve herd based scan avoidance without the use of central server 160 and central cache 165.

Compute nodes 130 are intended to include any electronic device, component, element, or object capable of performing voice, audio, video, media, and/or data exchanges within communication system 100 via some network. Compute nodes 130 are also capable of scanning objects for malware and/or other threats and generating signatures for the scanned objects. The term 'compute node' is inclusive of personal computers, laptops, mobile devices, smart appliances, and other Internet connected devices (e.g., television, digital video recorder (DVR), set-top box, Internet Radio Device (IRD), etc.). Mobile devices are intended to include mobile phones, smart mobile phones (smartphones), e-book readers, tablets, iPads, personal digital assistants (PDAs), laptops or electronic notebooks, portable navigation systems, multimedia gadgets (e.g., cameras, video and/or audio players, etc.), gaming systems, other handheld electronic devices, etc. A compute node may function as a source node and/or as a destination node of network traffic.

In various embodiments, compute nodes 130, and possibly central server 160, include logic (and/or reciprocating logic) that can coordinate, manage, or otherwise cooperate in order to achieve herd based scan avoidance, as outlined herein. Note that each of these elements can have an internal structure (e.g., a processor, memory element, etc.), as further described herein, to facilitate some of the herd based scan avoidance operations. In other embodiments, some of the herd based scan avoidance activities may be provided external to these elements, included in other devices to achieve these intended functionalities, or consolidated in any appropriate manner. The logic may be implemented as software, hardware, firmware, or any suitable combination thereof. Additionally, these elements may include any suitable algorithms, hardware, firmware, software, components, modules, interfaces, or objects that facilitate the operations thereof.

Compute nodes 130 in the herd include scan modules 132, which generate signatures of objects and compare the signatures against current caches of signatures. A signature of an object is compared to a current cache of signatures to determine whether a threat level (e.g., good, bad, unknown) of the object has been previously determined. A signature of an object can be generated from a cryptographic hash function, which is an algorithm that takes a block of data from the object and returns a fixed-size bit string. The fixed-size bit string is the hash value or signature. Examples of hash functions can include, but are not limited to: 1) Message-Digest Algorithm (e.g., MD5), defined by Network Working Group, Requests for Comments (RFC) 1321, R. Rivest, et al., April 1992, and 2) secure hash algorithm (SHA-1, SHA-2, SHA3), published by the United States National Institute of Standards and Technology (NIST) as a U.S. Federal Information Processing Standard.

Scan modules 132 can also perform scans of an object, if needed, to determine a threat level of the object. Typically, scans include deconstructing an object and analyzing the deconstructed portions of the object using heuristics. One type of heuristics includes the use of generic signatures to identify new viruses or variants of existing viruses by looking for known malicious code. A generic signature is a signature of a common area that viruses in a family may share uniquely. Generic signatures may contain non-contiguous code, using wildcard characters where the differences exist. The wildcard characters enable virus detection even if the object is padded with extra, and possibly meaningless, code.

Another type of heuristics includes predicting what an object will do by running it in a sandbox and analyzing what it does to see if it performs any malicious actions. In this technique, the sandbox could be a virtual environment in which the object is executed. The scan module can log the actions performed by the object. Based on the actions performed, scan module 132 can determine whether the object is a threat.

Scan modules 132 can also update their respective local caches 135 with results from the scanning. Local caches 135 represent caches or other memory elements configured to store scan results. A cache is a component that stores data so that future requests for the data can be served more quickly than data stored in another memory element. Although a cache can help shorten processing time and cycles, local cache 135 could also be configured as any other suitable memory element including main memory, secondary memory, removable storage, external storage, and any other element or component configured to receive and store data.

Local caches 135 can include signatures of objects and a threat level associated with each signature. In an embodiment, local cache 135 can contain a whitelist, which is generally configured with signatures of objects that are clean or free of malware or other threats (i.e., low threat level). In another embodiment, local cache 135 could contain a whitelist and a blacklist. A blacklist is generally configured with signatures of objects that are known to contain malware or other threats (i.e., high threat level). In some embodiments, local cache 135 could also include other signatures of objects for which the threat level is indeterminable. For local caches 135 that integrate the signatures associated with various threat levels, a representation of the actual threat levels is also included and mapped to the appropriate signatures.

In example embodiments, synchronization modules 134 can update local caches of other compute nodes with scan results from their own compute nodes. In other embodiments, synchronization modules 134 can update a central cache with scan results from their own compute nodes. In yet other embodiments, synchronization modules 134 can retrieve scan results from local caches of other compute nodes when their own local caches do not contain a needed signature.

Figure 2:
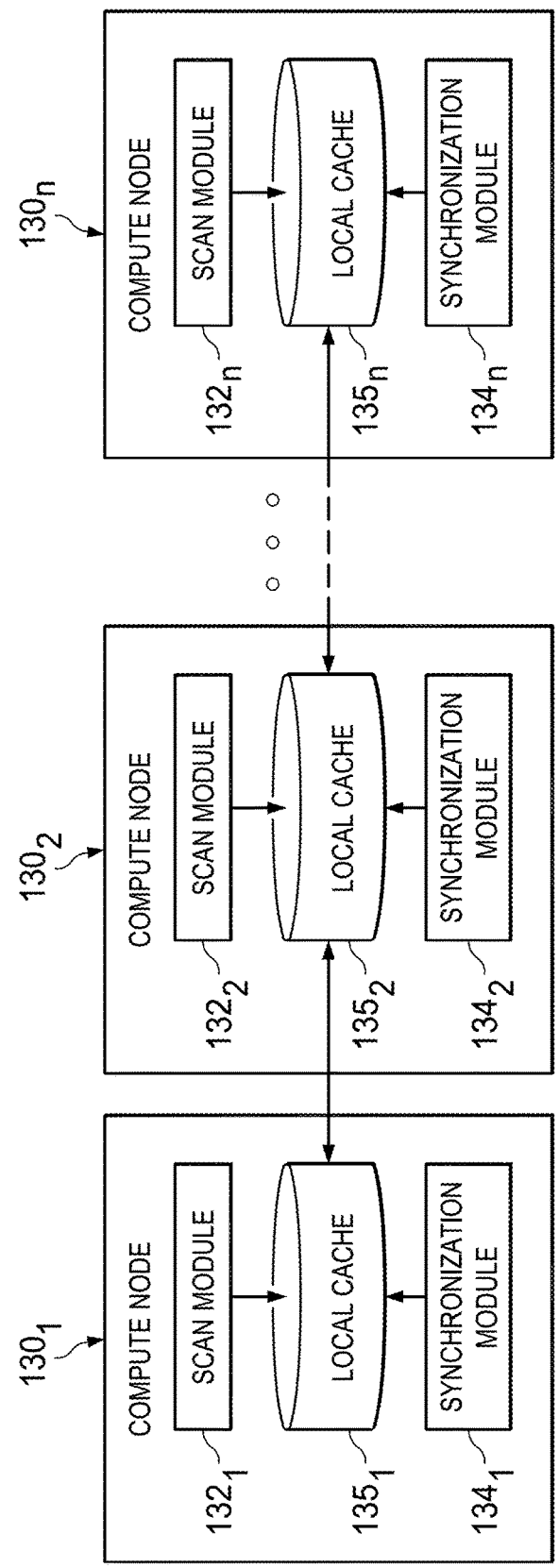
FIG. 2 is a simplified block diagram illustrating additional details of the system according to an example embodiment.

FIG. 2 is a block diagram illustrating embodiments in which each compute node 130 in a herd of network 115 is configured to synchronize its local cache 135 with the local caches of other compute nodes in the herd. The herd could be some or all of the compute nodes in the network. Various techniques may be used to facilitate communication between compute nodes 130 to enable local cache synchronization. In an embodiment, a generic broadcast message from a compute node may be used to communicate to other compute nodes on the same subnet. In another embodiment, the compute nodes may be synchronized using a messaging system across a dynamically negotiated spoke and hub based network with no central point. In these embodiments, other network elements such as central cache 165 and central server 160 are not needed for the synchronization activities, and may or may not be present in network 115. Although it could be implemented in larger networks, the local cache synchronization of FIG. 2 could be particularly advantageous when implemented in smaller network configurations, such as home networks or small business networks, for example. These smaller network configurations could be in the form of a local area network with router 140 to enable Internet connection for the compute nodes of the network.

Synchronization module 134 may be configured to employ the aforementioned techniques to synchronize its local cache 135 in a push approach, a pull approach, or a combination thereof. In a push approach, transmission of data is initiated by a sender of the data. In a pull approach, transmission of data is initiated by a receiver of the data. Additionally, the synchronization can be performed in real-time, whenever a scan is performed by a compute node. Alternatively, synchronization can be performed in a batch-like process after a period of time or after the occurrence of some triggering event. A triggering event could include, but is not limited to, a when a certain number of new objects have been received and scanned, when a certain number of new objects have been scanned and identified as threats, or when a compute node has come online in the network after being offline. Moreover, synchronization could be performed after one or more different triggering events occur and/or a period of time passes.

By way of example, in a push approach, synchronization module $134_1$ of compute node $130_1$ can store scan results of a new object in local cache $135_1$ and can send (or push) the scan results to other compute nodes $130_{2-n}$ in the herd (e.g., network 115), to be stored in respective local caches $135_{2-n}$. These scan results can be pushed to the other compute nodes $130_{2-n}$ after scan module $132_1$ of compute node $130_1$ scans a new object. In another implementation, synchronization module $134_1$ can push scan results for one or more objects to other compute nodes $130_{2-n}$ after a predetermined interval of time has passed and/or after one or more other triggering events occur.

In another implementation of the embodiment of FIG. 2, the synchronization modules can pull scan results from other compute nodes to synchronize their own local caches. For example, synchronization module $134_1$ of compute node $130_1$ can compare its own local cache $135_1$ to the local cache $135_2$ of compute node $130_2$. The delta (or difference) between the caches can be determined. Synchronization module $134_1$ can pull the object signatures of the delta from local cache $135_2$ and update its own local cache $135_1$ with the object signatures and corresponding threat levels from local cache $135_2$. Synchronization module $134_1$ may synchronize its local cache $135_1$ using a pull approach based on predetermined time intervals and/or one or more other appropriate triggering events (e.g., coming online in the network after being offline, etc.). In addition, both object signatures and their threat levels may be pushed to and pulled from another compute node if the delta indicates that one or more object signatures are in local cache $135_1$ but not in local cache $135_2$, and also indicates that one or more object signatures are in local cache $135_2$ but not in local cache $135_1$.

In a further embodiment, synchronization may be achieved across a set of dynamically selected compute nodes of a network. The set may be a subset of all of the compute nodes in the network. The set of compute nodes may be dynamically selected in order to maximize the likelihood of encountering similar object traffic patterns within the network. For example, in a larger network or in a dynamic environment in which numerous compute nodes are joining and leaving the network at any given time (e.g., a coffee shop), similar systems may be dynamically selected and grouped together. By way of illustration, a set of dynamically selected compute nodes may all operate using the same operating system. Thus, multiple separate herds may be formed within a network, such as network 115. Within each of the separate herds, local caches of the compute nodes may be synchronized.

Figure 3:
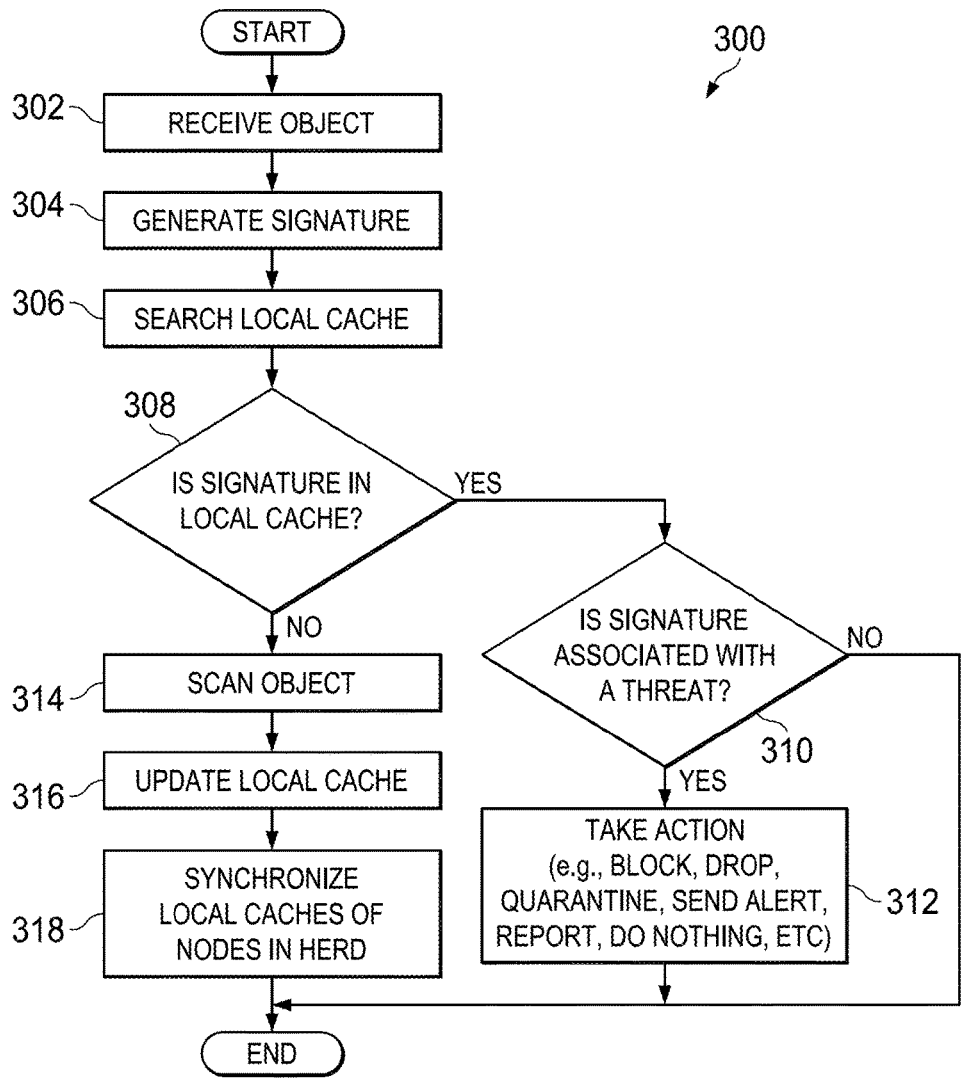
FIG. 3 is a simplified flow-chart illustrating example operations that may be associated with embodiments of the present disclosure.

Turning to FIG. 3, a flow chart illustrates a flow 300 of activities that may be performed, at least in part, by scan modules 132 of compute nodes 130. For ease of understanding, FIG. 3 will be described with respect to activities occurring in compute node $130_1$, although the activities could occur in any other compute node $130_2$-n in the herd. At 302, compute node $130_1$ in network 115 receives an object. The object could be received in various ways including, but not limited to, via an email attachment, a URL from a web browser, a file transfer, or a removable storage medium (e.g., USB, CD, DVD, etc.). At 304, one or more signatures of the object are generated. A signature may be generated using known hash algorithms such as MD5 hash or SHA-1, or any other hash algorithms whether currently known or not. In some embodiments, more than one signature may be generated for an object.

At 306, local cache $135_1$ of compute node $130_1$ is searched for the object's signature. If the signature is found at 308, and if local cache $135_1$ includes signatures of blacklisted (i.e., high threat level) objects, then at 310, a determination may be made as to whether the signature is associated with a threat, based on its threat level. If the signature is not associated with a threat, then flow 300 may end. If it is determined at 310, that the signature in local cache $135_1$ is associated with a threat, however, then at 312, compute node $130_1$ may take an appropriate action on the object. Actions could include, for example, blocking, dropping, or quarantining the object, sending an alert, reporting a malware attack or other threat, or doing nothing. Once appropriate action is taken, in accordance with the particular needs of network 115, then flow 300 may end.

If the signature is not found in local cache $135_1$, as determined at 308, then at 314, the object can be scanned. At 316, local cache $135_1$ may be updated with the scan results (e.g., hash and threat level). In accordance with an embodiment, at 318, synchronization module $134_1$ can synchronize the scan results with local caches $135_{2-n}$ in other compute nodes $130_{2-n}$ in the network by pushing the scan results to the other compute nodes. Any of the various communication techniques previously described herein (e.g., network broadcast message, dynamically negotiated spoke-and-hub network), or any other suitable communication techniques, may be used to perform the synchronization. In another implementation, synchronization module $134_1$ may aggregate scan results of new objects since the previous push, and wait until a predetermined interval of time has passed, and/or until one or more other triggering events occur, before pushing the aggregated scan results to the other compute nodes $130_{2-n}$.

In another embodiment, the synchronization of local cache $135_1$ with other local caches $135_{2-n}$ may not necessarily occur at 318. Synchronization module $134_1$ could be configured to pull updates from other compute nodes $130_2$-n. The updates could be pulled from other compute nodes$_{2-n}$ when a predetermined interval of time has passed and/or when one or more other triggering events occur, as previously described herein.

In an embodiment, local caches 135 may be configured as whitelists without other signatures associated with other threat levels. In this scenario, the processing at 310 and 312 may be performed before or after flow 300, and a separate blacklist cache (or other storage item) may be searched to determine whether the signature is associated with malware or other threats. In addition, after scans are performed at 316, the blacklist cache could be updated if the scan detected malware in the scanned object, and the whitelist cache could be updated if the scan did not detect any threats.

Figure 4:
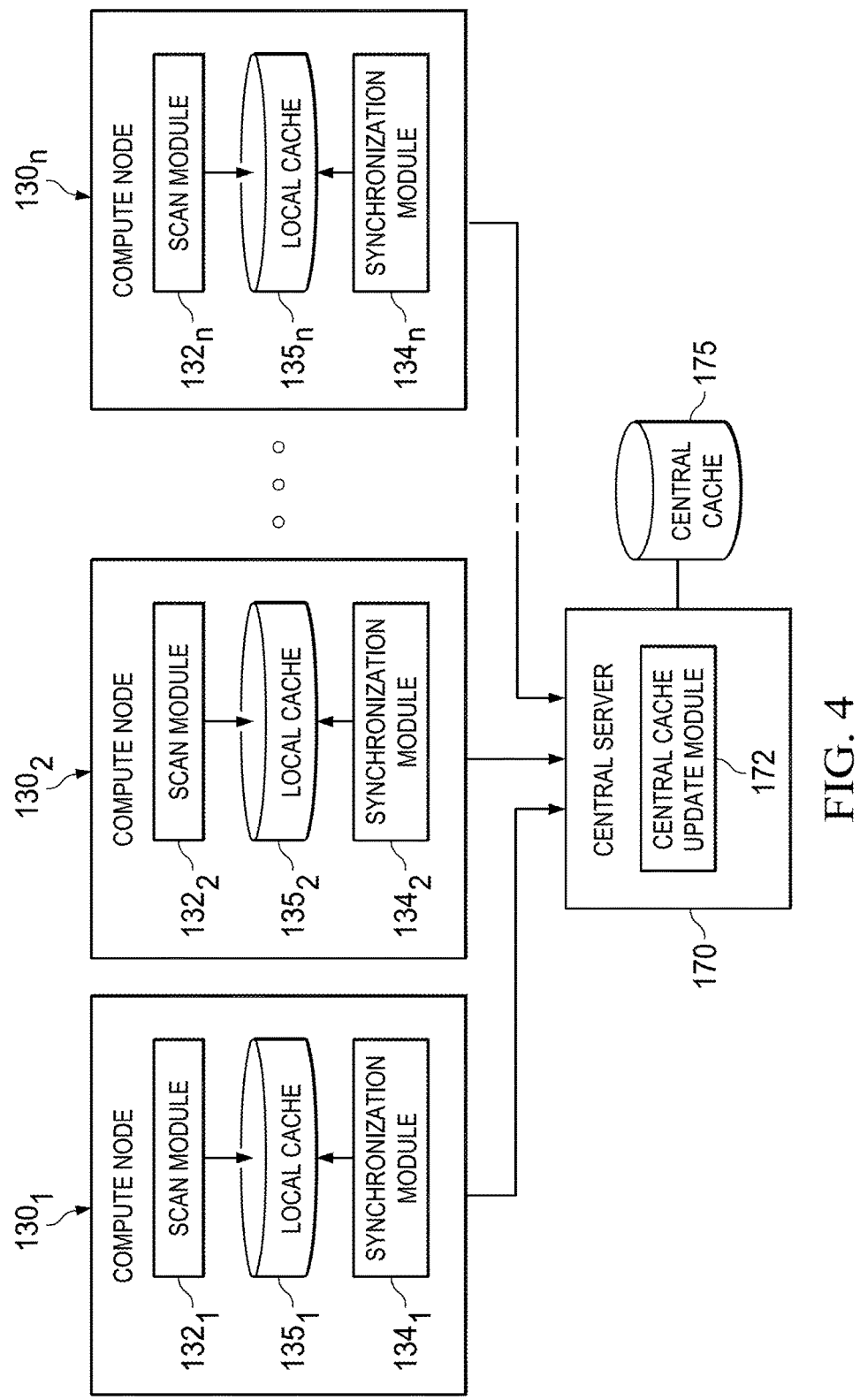
FIG. 4 is a simplified block diagram illustrating additional details of the system according to another example embodiment.

FIG. 4 is a block diagram illustrating embodiments in which central server 160 and central cache 165 of communication system 100 are provided as a central server 170 and a central cache 175 to achieve herd based scan avoidance by synchronizing central cache 175 to local caches 135. Central server 170 can be configured as a master server that receives scan results from all compute nodes 130 in network 115, or from all compute nodes in a herd that is a subset of the compute nodes in network 115. Central server 170 also includes central cache update module 172, which can store the received scan results from each local cache 135 in central cache 175. Accordingly, central cache 175 can contain the combined contents of local caches 135. Each local cache may have its own particular list of contents, which may or may not be the same as the contents of other local caches in the herd.

In the embodiments of FIG. 4, when a compute node, such as compute node $130_1$, receives a new object, scan module $132_1$ may generate the signature for the object and search its local cache $135_1$ for the object's signature. If it is not found, then scan module $132_1$ may request the object's signature from central server 170. If the object's signature is not found in central cache 175, then scan module $132_1$ can scan the object and store the scan results in local cache $135_1$.

Synchronization modules 134 of compute nodes 130 and central cache update module 172 of central server 170 may be configured to synchronize central cache 175 with scan results from compute nodes 130 in a push approach, a pull approach, or a combination thereof. In an embodiment, the synchronization of central cache 175 can be performed in real-time, using a push approach from a compute node whenever a scan is performed by the compute node. Alternatively, the synchronization of central cache 175 can be performed in a batch-like push process after a predetermined interval of time has elapsed or after the occurrence of one or more triggering events (e.g., certain number of new objects received and scanned, certain number of new objects scanned and identified as threats, when a compute node or central server comes online in the network after being offline, etc.).

By way of example, in a push approach, synchronization module $134_1$ of compute node $130_1$ can send (or push) scan results of a new object, which may be stored in local cache $135_1$, to central server 170, to be stored in central cache 175. In another implementation, synchronization module $134_1$ can push scan results for one or more objects to central server 170 after a predetermined interval of time has passed and/or after one or more other triggering events occur (e.g., 100 scans performed). In one embodiment, compute node $130_1$ may keep track of new scan results from one push update until the next push update. In this case, all of the new scan results since the last push update may be pushed to central server 170. In another embodiment, synchronization module $134_1$ may compare local cache $135_1$ to central cache 175 to determine the delta (difference) between the caches. The delta can identify which object signatures are present in local cache $135_1$ that are not also present in central cache 175. The object signatures identified by the delta can be pushed to central server 170.

In another implementation of the embodiment of FIG. 4, central cache update module 172 of central server 170 can pull scan results from compute nodes 130 to synchronize central cache 175 with each local cache 135. For example, central cache update module 172 can compare central cache 175 to local cache $135_1$ of compute node $130_1$. The delta (or difference) can be determined, to identify which signatures are on local cache $135_1$ that are not also on central cache 175. Central cache update module 172 can pull the object signatures of the delta from local cache $135_1$ and update central cache 175 with the pulled object signatures and corresponding threat levels from local cache $135_1$. Central cache update module 172 may synchronize central cache 175 using a pull approach based on predetermined time intervals and/or one or more other appropriate triggering events (e.g., central server 170 coming online in the network after being offline, etc.).

In yet another embodiment, synchronization may be achieved by using a design where a comparison of a local cache to some centrally arbitrated cache (e.g., central cache 175) causes bi-directional synchronization of data. Thus, in this implementation, each compute node 130 could maintain a complete local cache 135 synchronized to central cache 175, which is updated by each local cache in the herd as new objects are scanned.

Figure 5:
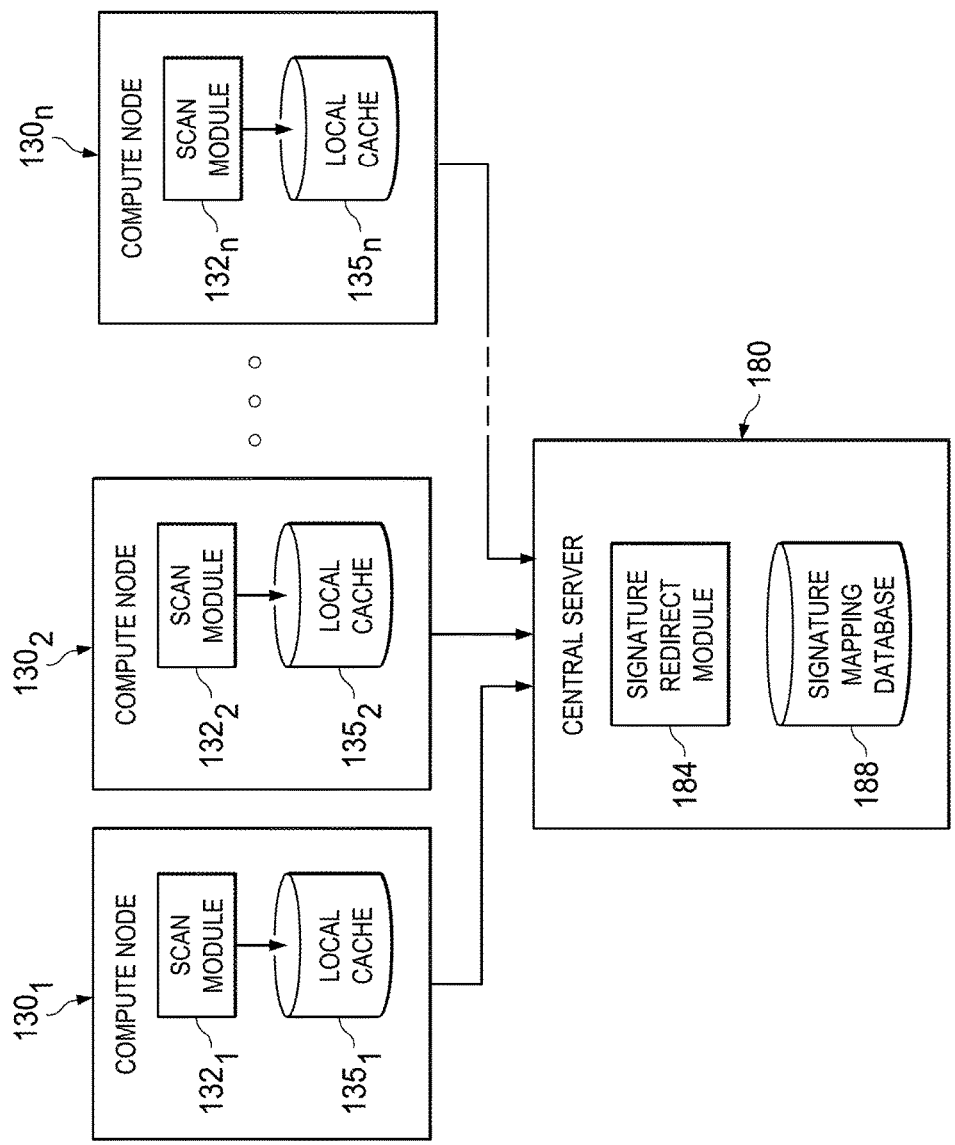
FIG. 5 is a simplified block diagram illustrating additional details of the system according to yet another example embodiment.

FIG. 5 is a block diagram illustrating embodiments in which central server 160 of communication system 100 is provided as central server 180. Central server 180 can be configured as a lobby server to achieve herd based scan avoidance by redirecting compute node requests for scan results to locations (e.g., other compute nodes in the herd) where the information is stored. Messaging between compute nodes 130 is arbitrated through central server 180, which can include a signature redirect module 184 and signature mapping database 188. Additionally, updates can be delivered and received by central server 180.

Central server 180 may not maintain a central cache of object signatures and threat levels. Instead, signature mapping database 188 can be configured as a mapping that indicates which compute nodes 130 in network 115 (or herd) contain which scan results in their local caches 135. Thus, each local cache may have its own particular list of object signatures, which may or may not be the same as the contents of other local caches in network 115. Central server 180 uses signature mapping database 188 to redirect requests from any compute node to any other compute node that has the requested object's signature and associated threat level in its local cache.

In the embodiments of FIG. 5, when a compute node, such as compute node $130_1$, receives a new object, scan module $132_1$ may generate the signature for the object and search its local cache $135_1$ for the object's signature. If it is not found, then scan module $132_1$ may request the object's signature from central server 180. Central server 180 searches signature mapping database 188 to find another compute node that has the object signature in its local cache. If central server 180 finds another compute node with the desired information, then signature redirect module 184 of central server 180 can redirect compute node $130_1$ to the other compute node. If the object's signature is not found in another compute node, then central server 180 can send a response to compute node $130_1$ indicating this result. Compute node $130_1$ can then scan the object and update its own local cache $135_1$. Compute node $130_1$ may also notify central server 180 that its local cache $135_1$ includes scan results for the object. Central server 180 can update its signature mapping database 188 with this information.

Figure 6:
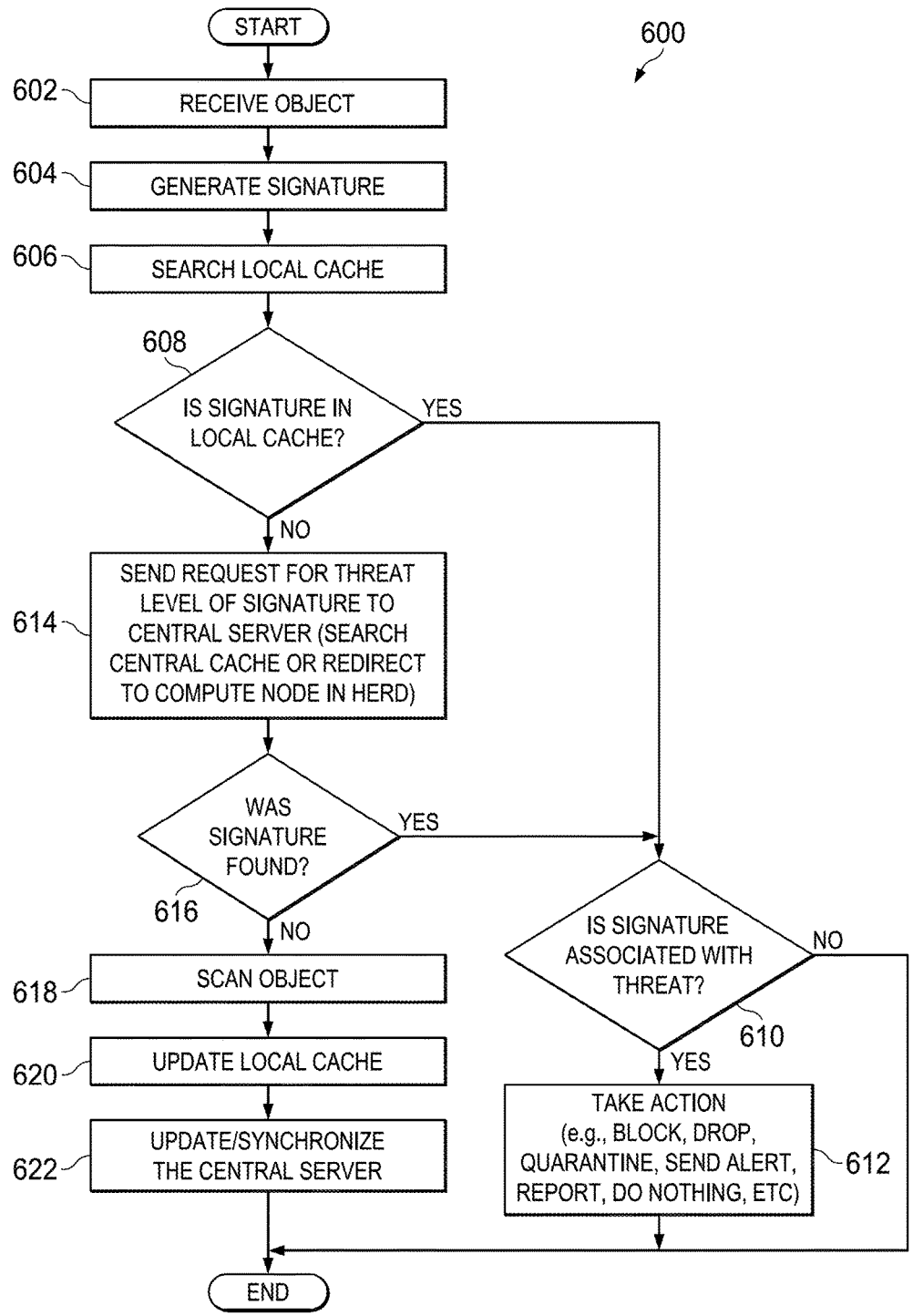
FIG. 6 is a simplified flow-chart illustrating example operations that may be associated with other embodiments of the present disclosure.

Turning to FIG. 6, a flow chart illustrates a flow 600 of activities that may be performed, at least in part, by scan modules 132 of compute nodes, when network 115 includes a central server configured as a master server (e.g., central server 170) as shown and described in with reference to FIG. 4, or as a lobby server (e.g., central server 180) as shown and described with reference to FIG. 5. For ease of understanding, FIG. 6 will be described with respect to activities occurring in compute node $130_1$, although the activities could occur in any other compute node $130_{2-n}$ in the herd.

At 602, compute node $130_1$ in network 115 receives an object. The object could be received in various ways including, but not limited to, via an email attachment, a URL from a web browser, a file transfer, or a removable storage medium (e.g., USB, CD, DVD, etc.). At 604, a signature of the object is generated. A signature may be generated using known hash algorithms such as MD5 hash or SHA-1, or any other hash algorithms whether currently known or not. In an embodiment, multiple signatures of the object may be generated.

At 606, local cache $135_1$ of compute node $130_1$ is searched for the object's signature. If the signature is found at 608, and if local cache $135_1$ includes signatures of blacklisted (i.e., high threat level) objects, then at 610, a determination may be made as to whether the signature is associated with a threat, based on its threat level. If the signature is not associated with a threat, then flow 600 may end. If it is determined at 610, that the signature in local cache $135_1$ is associated with a threat, however, then at 612, compute node $130_1$ may take an appropriate action on the object. Actions could include, for example, blocking, dropping, or quarantining the object, sending an alert, reporting a malware attack or other threat, or doing nothing. Once appropriate action is taken, in accordance with the particular needs of network 115, then flow 600 may end.

If the signature is not found in local cache $135_1$, as determined at 608, then at 614, compute node $130_1$ communicates with the central server (e.g., central server 170 or central server 180) that is configured in network 115. If a master server, such as central server 170, is configured in network 115, then compute node $130_1$ sends the object signature to central server 170 to request the threat level of the object. Central server 170 searches central cache 175 for the signature of the object. If the signature is found in central cache 175, then central server 170 sends the threat level of the object back to compute node $130_1$. If the signature is not found in central cache 175, however, then central server can send a response to compute node $130_1$ indicating that the object's signature was not found, and thus, the threat level of the object is not known. At least some of the operations of central server 170 may be performed by central cache update module 172.

In another embodiment, if a lobby server, such as central server 180, is configured in network 115, then at 614, compute node $130_1$ sends the object's signature to central server 180 to request the threat level of the object. Central server 180 searches its signature mapping database 188 and determines whether a local cache of another compute node in the herd contains the object's signature. If a local cache in another compute node contains the object's signature, such as local cache $135_2$ of compute node $130_2$, then central server 180 can redirect compute node $130_1$ to compute node $130_2$. The threat level of the object can be retrieved from local cache $135_2$. In some embodiments, compute node $130_1$ may update local cache $135_1$ with the signature and threat level of the object.

If central server 180 does not find another compute node in signature mapping database 188 that contains the object's signature, then central server 180 can send a response to compute node $130_1$ indicating that a threat level is not available for the object. At least some of the operations of central server 180 may be performed by signature redirect module 184.

At 616, it is determined whether the object's signature was found. If the signature was found (either in a central cache or in a local cache of another compute node). If the signature was found in a cache that includes signatures of blacklisted (i.e., high threat level) objects, then at 610, a determination may be made as to whether the signature is associated with a threat. If the signature is not associated with a threat, then flow 600 may end. If it is determined at 610, that the signature is associated with a threat, however, then at 612, compute node $130_1$ may take an appropriate action on the object, as previously described herein. Once appropriate action is taken, in accordance with the particular needs of network 115, then flow 600 may end.

If the object's signature is not found (either in central cache or in a local cache of another compute node) as determined at 616, then the object can be scanned at 618. At 620, local cache $135_1$ may be updated with the scan results (e.g., hash and threat level). As previously described herein, in an alternative embodiment, local caches 135 may each be configured as separate whitelist and blacklist caches. In this embodiment, the processing at 610 and 612 may be performed before or after flow 600. In addition, after scans are performed at 618, the blacklist cache could be updated if the scan detected malware in the scanned object, and the whitelist cache could be updated if the scan did not detect any threats.

If a master server, such as central server 170, is configured in network 115, then at 622, central cache 175 can be synchronized with local cache $135_1$, to be updated with the new scan results. In accordance with an embodiment, synchronization module $134_1$ can synchronize the scan results with central cache 175 by pushing the scan results to central server 170 in real-time once the scan has been completed. In another implementation, synchronization module $134_1$ may aggregate scan results of new objects since the previous push, and wait until a predetermined interval of time has passed and/or until one or more other triggering events occur, before pushing the aggregated scan results to central server 170. In another embodiment, synchronization module $134_1$ could compare local cache $135_1$ to central cache 175 and determine the delta, which identifies signatures that are present in local cache $135_1$, but not in central cache 175. Synchronization module $134_1$ could push the signatures, identified by the delta, and their associated threat levels to central server 175.

In another embodiment, central server 170 could be configured to pull updates from compute nodes 130, and could pull the scan results from compute node $130_1$, as previously described herein. The pull may be performed in real-time each time a scan has been completed by a compute node. In other embodiments, the pull may be performed after a predetermined interval of time has passed and/or after one or more triggering events have occurred, as previously described herein. In a pull approach, central cache update module 172 could compare local cache $135_1$ to central cache 175 and determine the delta, which identifies signatures that are present in local cache $135_1$, but not in central cache 175. Central cache update module 172 could pull the signatures, identified by the delta, and their associated threat levels from local cache $135_1$, and store them in central cache 175.

If a lobby server, such as central server 180, is configured in network 115, then at 622, after the object has been scanned and scan results have been generated, compute node $130_1$ can notify central server 180 that it has scan results of the object stored in its local cache $135_1$. Central server 180 can update signature mapping database 188 with this information, in order to redirect other compute nodes $130_{2-n}$ to compute node $130_1$ if the other compute nodes $130_{2-n}$ receive the same object and request a threat level from central server 180.

Figure 9:
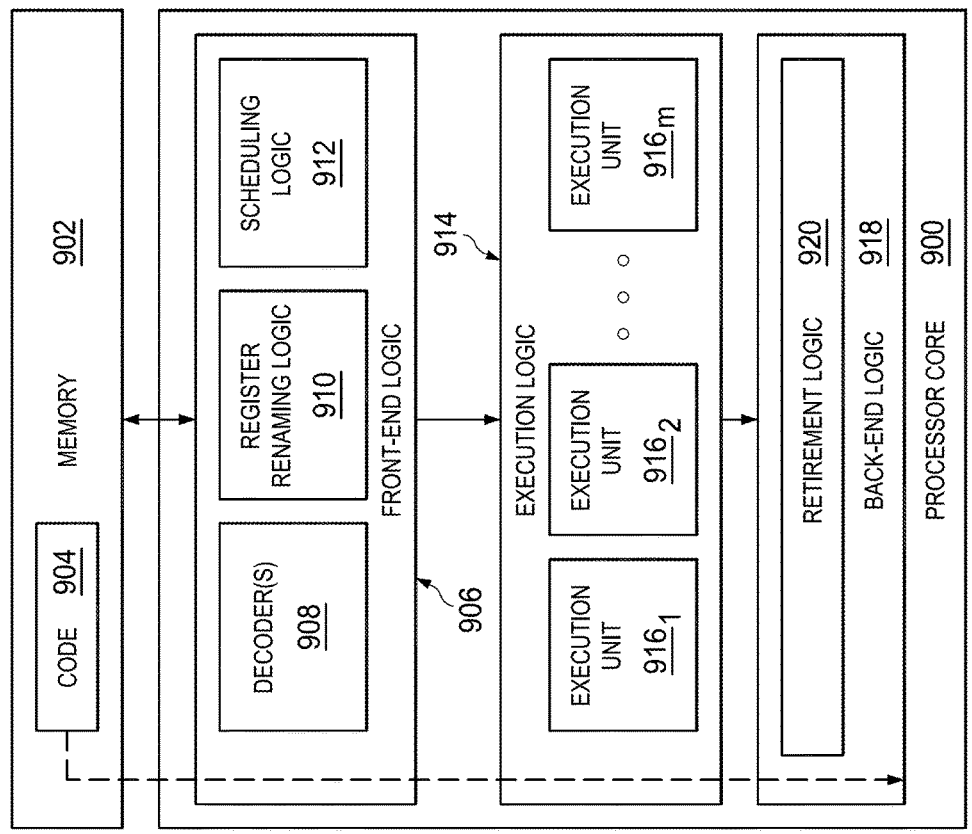
FIG. 9 is a simplified block diagram of an example processor according to an embodiment.
Figure 7:
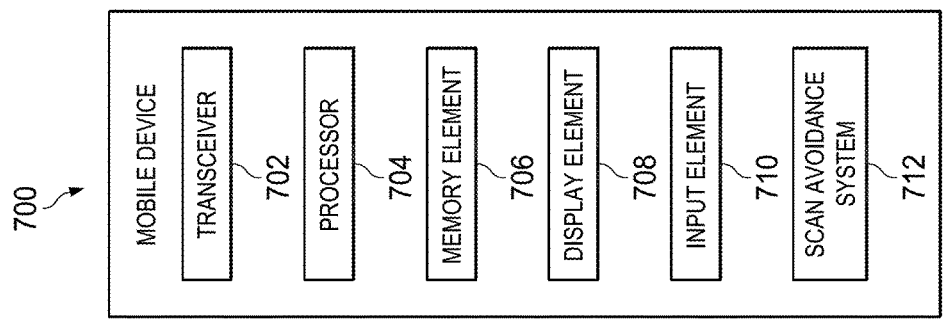
FIG. 7 is a simplified block diagram of an example mobile device according to an embodiment.

FIGS. 7-9 are block diagrams of exemplary computer architectures that may be used in accordance with embodiments disclosed herein. Other computer architecture designs known in the art for network elements and compute nodes may also be used. Generally, suitable computer architectures for embodiments disclosed herein can include, but are not limited to, configurations illustrated in FIGS. 7-9.

Referring now to FIG. 7, a block diagram is illustrated of an example mobile device 700. Mobile device 700 is an example of a possible compute node of network 115 in communication system 100. In an embodiment of this disclosure, mobile device 700 operates as a transmitter and a receiver of wireless communications signals. Specifically, in one example, mobile device 700 may be capable of both transmitting and receiving cellular network voice and data mobile services. Mobile services include such functionality as full Internet access, downloadable and streaming video content, as well as voice telephone communications.

Mobile device 700 may correspond to a conventional wireless or cellular portable telephone, such as a handset that is capable of receiving "3G", or "third generation" cellular services. In another example, mobile device 700 may be capable of transmitting and receiving "4G" mobile services as well, or any other mobile service.

Examples of devices that can correspond to mobile device 700 include cellular telephone handsets and smartphones, such as those capable of Internet access, email, and instant messaging communications, and portable video receiving and display devices, along with the capability of supporting telephone services. It is contemplated that those skilled in the art having reference to this specification will readily comprehend the nature of modern smartphones and telephone handset devices and systems suitable for implementation of the different aspects of this disclosure as described herein. As such, the architecture of mobile device 700 illustrated in FIG. 7 is presented at a relatively high level. Nevertheless, it is contemplated that modifications and alternatives to this architecture may be made and will be apparent to the reader, such modifications and alternatives contemplated to be within the scope of this description.

In an aspect of this disclosure, mobile device 700 includes a transceiver 702, which is connected to and in communication with an antenna. Transceiver 702 may be a radio frequency transceiver. Also, wireless signals may be transmitted and received via transceiver 702. Transceiver 702 may be constructed, for example, to include analog and digital radio frequency (RF) 'front end' functionality, circuitry for converting RF signals to a baseband frequency, via an intermediate frequency (IF) if desired, analog and digital filtering, and other conventional circuitry useful for carrying out wireless communications over modern cellular frequencies, for example, those suited for 3G or 4G communications. Transceiver 702 is connected to a processor 704, which may perform the bulk of the digital signal processing of signals to be communicated and signals received, at the baseband frequency. One such function of processor 704 is to provide a graphics interface to a display element 708, for the display of text, graphics, and video to the user.

In an aspect of this disclosure, processor 704 may be a processor that can execute any type of instructions to achieve the herd based scan avoidance operations, as detailed herein. Processor 704 may also be coupled to a memory element 706 for storing information to be used in achieving the herd based scan avoidance operations. Additional details of an example processor 704 and memory element 706 are subsequently described herein. In an example embodiment, mobile device 700 may be designed with a system-on-a-chip (SoC) architecture, which integrates many or all components of the mobile device into a single chip, in at least some embodiments.

In an aspect of this disclosure, memory element 706 of mobile device 700 may also include scan avoidance system 712. Scan avoidance system 712 may be configured to scan an object if its signature is not present in a local cache, or in a central cache, or in the local caches of other compute nodes in a herd. Scan avoidance system 712 can update its own local cache with the results of the scan. Finally, scan avoidance system 712 can synchronize the scan results with local caches in other nodes of the network to which mobile device 700 connects (e.g., network 115), or with a central cache in the network. One example of scan avoidance system 712 can include any of the embodiments described with reference to scan module 132, synchronization module 134, and local cache 135 of compute node 130 in communication system 100.

FIG. 8 illustrates a computing system 800 that is arranged in a point-to-point (PtP) configuration according to an embodiment. In particular, FIG. 8 shows a system where processors, memory, and input/output devices are interconnected by a number of point-to-point interfaces. Generally, one or more of the network elements and compute nodes of communication system 100 may be configured in the same or similar manner as computing system 800. For example, one or more of compute nodes 130 and central server 160 (including central servers 170 and 180), shown and described herein, may be configured in the same or similar manner as exemplary computing system 800.

Processors 870 and 880 may also each include integrated memory controller logic (MC) 872 and 882 to communicate with memory elements 832 and 834. In alternative embodiments, memory controller logic 872 and 882 may be discrete logic separate from processors 870 and 880. Memory elements 832 and/or 834 may store various data to be used by processors 870 and 880 in achieving operations associated with herd based scan avoidance, as outlined herein.

Processors 870 and 880 may be any type of processor, as further described herein. Processors 870 and 880 may exchange data via a point-to-point (PtP) interface 850 using point-to-point interface circuits 878 and 888, respectively. Processors 870 and 880 may each exchange data with a chipset 890 via individual point-to-point interfaces 852 and 854 using point-to-point interface circuits 876, 886, 894, and 898. Chipset 890 may also exchange data with a high-performance graphics circuit 838 via a high-performance graphics interface 839, using an interface circuit 892, which could be a PtP interface circuit. In alternative embodiments, any or all of the PtP links illustrated in FIG. 8 could be implemented as a multi-drop bus rather than a PtP link.

Chipset 890 may be in communication with a bus 820 via an interface circuit 896. Bus 820 may have one or more devices that communicate over it, such as a bus bridge 818 and I/O devices 816. Via a bus 810, bus bridge 818 may be in communication with other devices such as a keyboard/mouse 812 (or other input devices such as a touch screen, trackball, etc.), communication devices 826 (such as modems, network interface devices, or other types of communication devices that may communicate through a computer network 860), audio I/O devices 814, and/or a data storage device 828. Data storage device 828 may store code 830, which may be executed by processors 870 and/or 880. In alternative embodiments, any portions of the bus architectures could be implemented with one or more PtP links.

The computer system depicted in FIG. 8 is a schematic illustration of an embodiment of a computing system that may be utilized to implement various embodiments discussed herein. It will be appreciated that various components of the system depicted in FIG. 8 may be combined in a system-on-a-chip (SoC) architecture or in any other suitable configuration capable of achieving herd based scan avoidance as provided herein.

FIG. 9 illustrates a processor core 900 according to an embodiment. Processor core 900 may be the core for any type of processor, such as a micro-processor, an embedded processor, a digital signal processor (DSP), a network processor, a multi-core processor, a single core processor, or other device to execute code. Processor core 900 represents an example embodiment of processor cores 874a, 874b, 884a, and 884b shown and described with reference to processors 870 and 880 of computing system 800, and also of processor 704 of mobile device 700. Processor core 900 may be a single-threaded core or may be multithreaded. In a multithreaded core, it may include more than one hardware thread context (or "logical processor") per core.

Processor 900 can execute any type of instructions associated with the data to achieve the herd based scan avoidance operations detailed herein. Generally, processor 900 can transform an element or an article (e.g., data) from one state or thing to another state or thing.

FIG. 9 also illustrates a memory 902 coupled to processor core 900 in accordance with an embodiment. Memory 902 represents an example embodiment of memory element 706 of mobile device 700, and also of memory elements 832 and 834 of computing system 800. Memory 902 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), electrically erasable programmable ROM (EEPROM).

Code 904, which may be one or more instructions to be executed by processor core 900, may be stored in memory 902, or may be stored in software, hardware, firmware, or any suitable combination thereof, or in any other internal or external component, device, element, or object where appropriate and based on particular needs. In example embodiments, code 904 represents various modules described herein (e.g., scan modules 132, synchronization modules 134, central cache update module 172, signature redirect module 184). In one example, processor core 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Front-end logic 906 also includes register renaming logic 910 and scheduling logic 912, which generally allocate resources and queue the operation corresponding to the instruction for execution.

Processor core 900 can also include execution logic 914 having a set of execution units $916_1$ through $916_m$. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor core 900 allows out of order execution but requires in order retirement of instructions. Retirement logic 920 may take a variety of known forms (e.g., re-order buffers or the like). In this manner, processor core 900 is transformed during execution of code 904, at least in terms of the output generated by the decoder, hardware registers and tables utilized by register renaming logic 910, and any registers (not shown) modified by execution logic 914.

A processor may include other elements on a chip with processor core 900, at least some of which were shown and described herein with reference to FIG. 9. For example, as shown in FIG. 9, a processor may include memory control logic along with processor core 900. The processor may include I/O control logic and/or may include I/O control logic integrated with memory control logic.

Logic, such as code 904, for herd based scan avoidance can be provided at various locations (e.g., compute nodes 130, central servers 160, 170, 180). In one example implementation, this logic is resident in a compute node (and possibly a central server) sought to be protected from a security attack. This logic could be locally installed on compute nodes 130 (and on a central server for some embodiments). Alternatively, this logic could be received or downloaded from a web server (e.g., in the context of purchasing individual end-user licenses for separate devices, applications, etc.) in order to provide this security protection.

In other examples, the functions described herein could involve a proprietary element (e.g., as part of an antivirus solution), which could be provided in (or be proximate to) these identified elements, or be provided in any other network element or other device, or be provided as a complementary solution (e.g., in conjunction with a firewall), or provisioned somewhere in the network. In addition, the functions described herein can be consolidated in any suitable manner.

The herd based scan avoidance functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by processor 900, or other similar machine, etc.). The tangible media may be non-transitory in at least some embodiments. In some of these instances, memory (e.g., memory 902) can store data used for the operations described herein. This includes the memory being able to store software, logic, code, or processor instructions that are executed to carry out the activities described in this Specification. In an embodiment, the tangible media may be provided in each one of compute nodes 130.

In certain embodiments, the activities outlined herein may be implemented with fixed logic or programmable logic (e.g., software/computer instructions executed by processor 900, or other similar machine) and the elements identified herein could be some type of a programmable processor, programmable digital logic (e.g., a field programmable gate array (FPGA), an erasable programmable read only memory (EPROM), an electrically erasable programmable ROM (EEPROM)), or an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Additionally, the information being tracked, sent, received, or stored in communication system 100 could be provided in any database, register, table, cache, queue, control list, or storage structure, based on particular needs and implementations, all of which could be referenced in any suitable timeframe. Any of the memory items discussed herein should be construed as being encompassed within the broad term 'memory element'. Similarly, any of the potential processing elements, modules, and machines described in this Specification should be construed as being encompassed within the broad term 'processor'. Moreover, each of the mobile devices, network elements, compute nodes, etc. can also include suitable interfaces for receiving, transmitting, and/or otherwise communicating data or information in a secure environment.

Note that with the numerous examples provided herein, interaction may be described in terms of two, three, four, or more network elements, compute nodes, modules, and/or other components. However, this has been done for purposes of clarity and example only. It should be appreciated that the system can be consolidated in any suitable manner. Along similar design alternatives, any of the illustrated modules, nodes, elements, and other components of FIG. 1 may be combined in various possible configurations, all of which are clearly within the broad scope of this Specification. In certain cases, it may be easier to describe one or more of the functionalities of a given set of flows by only referencing a limited number of components. It should be appreciated that the system of FIG. 1 (and its teachings) is readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

It is also important to note that the operations described with reference to the preceding FIGURES illustrate only some of the possible scenarios that may be executed by, or within, the system. Some of these operations may be deleted or removed where appropriate, or these operations may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

The following examples pertain to embodiments in accordance with this Specification. One or more embodiments may provide a method, comprising generating a signature for an object in a compute node in a network; searching a memory element for the signature; responsive to determining the memory element does not contain the signature, scanning the object; updating the memory element with a scan result; and synchronizing the memory element of the compute node with one or more memory elements of one or more other compute nodes in the network.

In an example of an embodiment, the scan result includes the signature of the object and a threat level of the object.

In an example of an embodiment, the synchronizing includes sending the scan result to the one or more other compute nodes in the network.

In an example of an embodiment, the scan result is sent with one or more other scan results after a predetermined interval of time from a previous synchronization.

In an example of an embodiment, the synchronizing includes pulling one or more scan results from at least one other compute node in the network.

In an example of an embodiment, the compute node and the one or more other compute nodes form a herd of compute nodes in the network, and the network includes two or more herds of compute nodes.

In an example of an embodiment, the memory element comprises a whitelist and a blacklist.

One or more embodiments may provide at least one machine readable storage medium having instructions stored thereon, the instructions when executed by a processor cause the processor to: generate a signature for an object in a compute node in a network; search a memory element for the signature; responsive to determining the memory element does not contain the signature, scan the object; update the memory element with a scan result; and synchronize the memory element of the compute node with one or more memory elements of one or more other compute nodes in the network.

In an example of an embodiment, the scan result includes the signature of the object and a threat level of the object.

An example of an embodiment comprises further instructions that when executed by the processor cause the processor to send the scan result to the one or more other compute nodes in the network.

An example of an embodiment comprises further instructions that when executed by the processor cause the processor to send the scan result with one or more other scan results after a predetermined interval of time from a previous synchronization.

An example of an embodiment comprises further instructions that when executed by the processor cause the processor to pull one or more scan results from at least one other compute node in the network.

In an example of an embodiment, the compute node and the one or more other compute nodes form a herd of compute nodes in the network, and the network includes two or more herds of compute nodes.

In an example of an embodiment, the memory element comprises a first local cache and a second local cache. In this embodiment, the first local cache includes a whitelist and the second local cache includes a blacklist.

One or more embodiments may provide an apparatus, comprising: a processor; a scan module executing on the processor, the scan module configured to: generate a signature for an object in a compute node in a network; search a memory element for the signature; responsive to determining the memory element does not contain the signature, scan the object; and update the memory element with a scan result; and a synchronization module executing on the processor, the synchronization module configured to synchronize the memory element of the compute node with one or more memory elements of one or more other compute nodes in the network.

In an example of an embodiment, the scan result includes the signature of the object and a threat level of the object.

In an example of an embodiment, the synchronization module is further configured to send the scan result to the one or more other compute nodes in the network.

In an example of an embodiment, the synchronization module is configured to send the scan result with one or more other scan results after a predetermined interval of time from a previous synchronization.

In an example of an embodiment, the synchronization module is further configured to pull one or more scan results from at least one other compute node in the network.

In an example of an embodiment, the one or more scan results are pulled after a predetermined interval of time from a previous synchronization.

In an example of an embodiment, the compute node and the one or more other compute nodes form a herd of compute nodes in the network, and the network includes two or more herds of compute nodes.

One or more embodiments may provide at least one machine readable storage medium having instructions stored thereon, the instructions when executed by a processor cause the processor to: generate a signature for an object in a compute node in a network; search a local memory element for the signature; responsive to determining the local memory element does not contain the signature, send a request to a central server for a threat level associated with the signature; responsive to receiving a response indicating that the signature is not found, scan the object; update the local memory element with a scan result; and send information associated with the scan result to the central server.

In an example of an embodiment, the scan result includes the signature of the object and a threat level of the object.

An example of an embodiment comprises further instructions that when executed by the processor cause the processor to, responsive to the request being redirected to a second compute node in the network, retrieve a threat level associated with the signature from the second compute node.

In an example of an embodiment, the information includes a message indicating that the local memory element of the compute node includes the scan result of the object, and the central server updates a signature mapping database based on the information.

An example of an embodiment comprises further instructions that when executed by the processor cause the processor to send the information to the central server with other information associated with other scans after a predetermined number of scans have been performed.

In an example of an embodiment, the information includes the scan result, and the central server updates a central cache based on the information.

In an example of an embodiment, the central cache includes two or more scan results from two or more compute nodes in the network, and the compute node is one of the two or more compute nodes.

In an example of an embodiment, the two or more compute nodes form a herd of compute nodes in the network, and the network includes two or more herds of compute nodes.

One or more embodiments may provide an apparatus, comprising: a processor; a scan module executing on the processor, the scan module configured to: generate a signature for an object in a compute node in a network; search a local memory element for the signature; responsive to determining the local memory element does not contain the signature, send a request to a central server for a threat level associated with the signature; responsive to receiving a response indicating that the signature is not found, scan the object; update the local memory element with a scan result; and send information associated with the scan result to the central server.

One or more embodiments may provide a method, comprising: generating a signature for an object in a compute node in a network; searching a local memory element for the signature; responsive to determining the local memory element does not contain the signature, sending a request to a central server for a threat level associated with the signature; responsive to receiving a response indicating that the signature is not found, scanning the object; updating the local memory element with a scan result; and sending information associated with the scan result to the central server.

One particular example implementation may include means for generating a signature for an object in a compute node in a network; means for searching a memory element for the signature; means for scanning the object in response to determining the memory element does not contain the signature; means for updating the memory element with a scan result; and means for synchronizing the memory element of the compute node with one or more memory elements of one or more other compute nodes in the network. In the implementation, the scan result may include the signature of the object and a threat level of the object. In the implementation, the synchronizing may include sending the scan result to the one or more other compute nodes in the network. In the implementation the scan result is sent with one or more other scan results after a predetermined interval of time from a previous synchronization. In the implementation the synchronizing may further include pulling one or more scan results from at least one other compute node in the network. The implementation may also include the compute node and the one or more other compute nodes forming a herd of compute nodes in the network, where the network includes two or more herds of compute nodes. In the implementation, the memory element may include a whitelist and a blacklist, or the memory element may include separate caches for the whitelist and the blacklist.

Another particular example implementation may include means for generating a signature for an object in a compute node in a network; means for searching a local memory element for the signature; means for sending a request to a central server for a threat level associated with the signature, in response to determining the local memory element does not contain the signature; means for scanning the object in response to receiving a response indicating that the signature is not found; means for updating the local memory element with a scan result; and means for sending information associated with the scan result to the central server. In the implementation the scan result may include the signature of the object and a threat level of the object. The implementation may further comprise instructions that when executed by the processor cause the processor to, responsive to the request being redirected to a second compute node in the network, retrieve a threat level associated with the signature from the second compute node. In the implementation, the information may include a message indicating that the local memory element of the compute node includes the scan result of the object, and the central server may update a signature mapping database based on the information. The implementation may comprise further instructions that when executed by the processor cause the processor to send the information to the central server with other information associated with other scans after a predetermined number of scans have been performed. In the implementation, the information may include the scan result, and the central server may update a central cache based on the information. In the implementation, the central cache may include two or more scan results from two or more compute nodes in the network, and the compute node is one of the two or more compute nodes. In the implementation, the two or more compute nodes form a herd of compute nodes in the network, and the network includes two or more herds of compute nodes.

What is claimed is:

1. At least one non-transitory machine readable storage medium having instructions stored thereon, the instructions when executed by at least one processor cause the at least one processor to:

generate a signature for an object in a first compute node of a first plurality of compute nodes connected to a network;

search a local cache in a memory element of the first compute node for the signature;

scan the object with a scan module to obtain a scan result if the signature is not found in the local cache;

update the local cache with the scan result including the signature of the object;

select a first subset of the first plurality of compute nodes in the network based, at least in part, on a particular attribute of each compute node in the first subset, wherein the particular attribute is associated with a certain traffic pattern;

dynamically select, by the first compute node, a second subset of a second plurality of compute nodes connected to the network based, at least in part, on the particular attribute being associated with each compute node in the second subset, wherein the second plurality of compute nodes is to comprise an additional compute node that establishes a connection to the network subsequent to the selection of the first subset, the second subset to include any compute nodes of the first subset that are included in the second plurality of compute nodes and the additional compute node based on determining that an attribute of the additional compute node corresponds to the particular attribute of the compute nodes in the second subset; and synchronize the updated local cache with one or more local caches of one or more compute nodes in the second subset, wherein synchronizing is to include:

sending, from the first compute node, the scan result to the one or more compute nodes of the second subset; and receiving, at the first compute node, one or more scan results of one or more other objects from at least one other compute node in the second subset;

wherein the scan result indicates a threat level of the object, and wherein after the scan result is obtained, the local cache is to be updated with the threat level of the object.

2. The at least one non-transitory machine readable storage medium of claim 1, wherein the one or more scan results are to be stored in the updated local cache of the first compute node.

3. The at least one non-transitory machine readable storage medium of claim 1, wherein the first subset is to be selected based, at least in part, on a system similarity indicated by the particular attribute of each compute node in the first subset.

4. The at least one non-transitory machine readable storage medium of claim 1, wherein the particular attributes of the compute nodes in the first and second subsets are to indicate a same operating system.

5. The at least one non-transitory machine readable storage medium of claim 1, wherein the instructions when executed by at least one processor cause the at least one processor to:
dynamically select a third subset of a third plurality of compute nodes connected to the network based, at least in part, on the particular attribute being associated with each compute node of the third subset, wherein the third plurality of compute nodes lacks at least one compute node of the second subset that terminated a connection to the network subsequent to the selection of the second subset.

6. The at least one non-transitory machine readable storage medium of claim 1, wherein the network includes two or more subsets of the first plurality of compute nodes, wherein each subset is associated with a respective attribute indicating a similarity between compute nodes in that subset.

7. The at least one non-transitory machine readable storage medium of claim 1, wherein the local cache in the memory element of the first compute node comprises at least one of a whitelist and a blacklist.

8. The computer-readable medium of claim 1, wherein the first subset includes the first compute node and one or more other compute nodes in the first plurality of compute nodes, and wherein the second subset includes the first compute node and at least the additional compute node.

9. An apparatus, comprising:
a hardware processor;
a scan module configured to be executed by the hardware processor to:
generate a signature for an object in a first compute node of a first plurality of compute nodes connected to a network;
search a local cache in a memory element of the first compute node for the signature;
scan the object to obtain a scan result if the signature is not found in the local cache; and
update the local cache with the scan result including the signature of the object; and
a synchronization module configured to be executed by the hardware processor to:
select a first subset of the first plurality of compute nodes in the network based, at least in part, on a particular attribute of each compute node in the first subset, wherein the particular attribute is associated with a certain traffic pattern;
dynamically select, by the first compute node, a second subset of a second plurality of compute nodes connected to the network based, at least in part, on the particular attribute being associated with each compute node in the second subset, wherein the second plurality of compute nodes is to comprise an additional compute node that establishes a connection to the network subsequent to the selection of the first subset, the second subset to include any compute nodes of the first subset that are included in the second plurality of compute nodes and the additional compute node based on determining that an attribute of the additional compute node corresponds to the particular attribute of the compute nodes in the second subset; and
synchronize the updated local cache with one or more local caches of one or more compute nodes in the second subset, wherein synchronizing is to include:
sending, from the first compute node, the scan result to the one or more compute nodes of the second subset; and
receiving, at the first compute node, one or more scan results of one or more other objects from at least one other compute node in the second subset;
wherein the scan result indicates a threat level of the object, and wherein after the scan result is obtained, the local cache is to be updated with the threat level of the object.

10. The apparatus of claim 9, wherein the one or more scan results are to be stored in the local cache of the first compute node.

11. The apparatus of claim 9, wherein the particular attributes of the compute nodes in the first and second subsets are to indicate a same operating system.

12. The apparatus of claim 9, wherein the network includes two or more subsets of the first plurality of compute nodes, wherein each subset is associated with a respective attribute indicating a similarity between compute nodes in that subset.

13. The apparatus of claim 9, wherein the first subset is to be selected based, in part, on a traffic pattern indicated by the particular attribute of each compute node of the first subset.

14. The apparatus of claim 9, wherein the synchronization module is configured to be executed by the hardware processor further to:
dynamically select a third subset of a third plurality of compute nodes connected to the network based, at least in part, on the particular attribute being associated with each compute node of the third subset, wherein the third plurality of compute nodes lacks at least one compute node of the second subset that terminated a connection to the network subsequent to the selection of the second subset.

15. The apparatus of claim 9, wherein the first subset includes the first compute node and one or more other compute nodes in the first plurality of compute nodes, and wherein the second subset includes the first compute node and at least the additional compute node.

16. The apparatus of claim 9, wherein the one or more scan results are to be stored in the updated local cache of the first compute node.

17. The apparatus of claim 9, wherein the local cache in the memory element of the first compute node comprises at least one of a whitelist and a blacklist.

18. A method comprising:
generating a signature for an object in a first compute node of a first plurality of compute nodes connected to a network;
searching a local cache in a memory element of the first compute node for the signature;
scanning the object with a scan module to obtain a scan result if the signature is not found in the local cache;
updating the local cache with the scan result including the signature of the object;

selecting a first subset of the first plurality of compute nodes in the network based, at least in part, on a particular attribute of each compute node in the first subset, wherein the particular attribute is associated with a certain traffic pattern;

dynamically selecting, by the first compute node, a second subset of a second plurality of compute nodes connected to the network based, at least in part, on the particular attribute being associated with each compute node in the second subset, wherein the second plurality of compute nodes is to comprise an additional compute node that establishes a connection to the network subsequent to the selection of the first subset, the second subset to include any compute nodes of the first subset that are included in the second plurality of compute nodes and the additional compute node based on determining that an attribute of the additional compute node corresponds to the particular attribute of the compute nodes in the second subset; and synchronizing the updated local cache with one or more local caches of one or more compute nodes in the second subset, wherein the synchronizing includes:

sending, from the first compute node, the scan result to the one or more compute nodes of the second subset; and receiving, at the first compute node, one or more scan results of one or more other objects from at least one other compute node in the second subset;

wherein the scan result indicates a threat level of the object, and wherein after the scan result is obtained, the local cache is to be updated with the threat level of the object.

19. The method of claim 18, wherein the one or more scan results are stored in the updated local cache of the first compute node.

20. The method of claim 18, wherein the network includes two or more subsets of the first plurality of compute nodes, wherein each subset is associated with a respective attribute indicating a similarity between compute nodes in that subset.

* * * * *